(12) United States Patent
Lee et al.

(10) Patent No.: US 11,367,434 B2
(45) Date of Patent: Jun. 21, 2022

(54) ELECTRONIC DEVICE, METHOD FOR DETERMINING UTTERANCE INTENTION OF USER THEREOF, AND NON-TRANSITORY COMPUTER-READABLE RECORDING MEDIUM

(71) Applicant: Samsung Electronics Co., Ltd., Suwon-si (KR)

(72) Inventors: Dong-hyeon Lee, Suwon-si (KR); Hae-hun Yang, Seoul (KR); He-jung Yang, Seongnam-si (KR); Jung-sup Lee, Suwon-si (KR); Hee-sik Jeon, Yongin-si (KR); Hyung-tak Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 54 days.

(21) Appl. No.: 16/467,610

(22) PCT Filed: Dec. 19, 2017

(86) PCT No.: PCT/KR2017/015041
§ 371 (c)(1),
(2) Date: Jun. 7, 2019

(87) PCT Pub. No.: WO2018/117608
PCT Pub. Date: Jun. 28, 2018

(65) Prior Publication Data
US 2020/0074993 A1 Mar. 5, 2020

(30) Foreign Application Priority Data

Dec. 20, 2016 (KR) .................. 10-2016-0174640
Nov. 3, 2017 (KR) .................. 10-2017-0145743

(51) Int. Cl.
*G10L 15/22* (2006.01)
*G10L 15/18* (2013.01)
(Continued)

(52) U.S. Cl.
CPC .......... *G10L 15/1822* (2013.01); *G06F 3/048* (2013.01); *G10L 15/05* (2013.01);
(Continued)

(58) Field of Classification Search
CPC ..................................................... G10L 15/02
See application file for complete search history.

(56) References Cited

U.S. PATENT DOCUMENTS 7,149,687 B1   12/2006  Gorin et al.
8,626,511 B2   1/2014   Lebeau et al.
(Continued)

FOREIGN PATENT DOCUMENTS

JP   2005-283972 A   10/2005
JP   2007-017990 A   1/2007
(Continued)

OTHER PUBLICATIONS

Korean Office Action dated Feb. 14, 2022, issued in Korean Patent Application No. 10-2017-0145743.

*Primary Examiner* — Feng-Tzer Tzeng
(74) *Attorney, Agent, or Firm* — Jefferson IP Law, LLP

(57) ABSTRACT

An electronic device, a method for obtaining an utterance intention of a user thereof, and a non-transitory computer-readable recording medium are provided. An electronic device according to an embodiment of the present disclosure may comprise: a microphone for receiving a user voice uttered by a user; and a processor for obtaining an utterance intention of a user on the basis of at least one word included in a user voice while the user voice is being input, providing response information corresponding to the obtained utter- (Continued)

ance intention, and updating the response information while providing the response information, on the basis of an additional word uttered after the at least one word is input.

16 Claims, 18 Drawing Sheets

(51) Int. Cl.
  *G10L 15/05* (2013.01)
  *G06F 3/048* (2013.01)
  *G10L 15/02* (2006.01)

(52) U.S. Cl.
  CPC .............. *G10L 15/22* (2013.01); *G10L 15/02* (2013.01); *G10L 2015/223* (2013.01); *G10L 2015/225* (2013.01)

(56) References Cited

U.S. PATENT DOCUMENTS

| | | | |
|---|---|---|---|
| 8,719,015 | B2 | 5/2014 | Jang et al. |
| 8,903,793 | B2 | 12/2014 | Bangalore |
| 8,914,288 | B2 | 12/2014 | Williams et al. |
| 9,142,212 | B2 | 9/2015 | Park et al. |
| 9,147,395 | B2 | 9/2015 | Kim et al. |
| 9,305,569 | B2 | 4/2016 | Jang et al. |
| 9,318,111 | B2 | 4/2016 | Lee et al. |
| 2005/0273337 | A1* | 12/2005 | Erell .................. G10L 15/07 704/260 |
| 2011/0184730 | A1 | 7/2011 | Lebeau et al. |
| 2012/0179467 | A1* | 7/2012 | Williams ............ G10L 15/22 704/249 |
| 2016/0148610 | A1* | 5/2016 | Kennewick, Jr. ..... G10L 15/18 704/240 |

FOREIGN PATENT DOCUMENTS

| | | |
|---|---|---|
| KR | 10-2011-0066357 A | 6/2011 |
| KR | 10-2011-0086492 A | 7/2011 |
| KR | 10-2012-0012919 A | 2/2012 |
| KR | 10-1208166 B1 | 12/2012 |
| KR | 10-2014-0001711 A | 1/2014 |
| KR | 10-2015-0103326 A | 9/2015 |
| WO | 2010-003109 A2 | 1/2010 |
| WO | 2016-054230 A1 | 4/2016 |

* cited by examiner

ELECTRONIC DEVICE, METHOD FOR DETERMINING UTTERANCE INTENTION OF USER THEREOF, AND NON-TRANSITORY COMPUTER-READABLE RECORDING MEDIUM

TECHNICAL FIELD

The disclosure relates to an electronic device, a method for obtaining an utterance intention of a user thereof, and a non-transitory computer-readable recording medium. More specifically, the disclosure relates to an electronic device that is capable of providing response information before a user completes an utterance, a method for obtaining an utterance intention of a user thereof, and a non-transitory computer-readable recording medium.

Also, the disclosure relates to an artificial intelligence (AI) system that simulates functions of a human brain such as cognition and determination by using a machine learning algorithm such as deep learning, and application thereof.

BACKGROUND ART

As functions of a mobile device, a voice recognition device, a home network hub device, etc. have improved recently, the number of users using such devices is increasing. In particular, electronic devices as above provide a function of a virtual personal assistant (VPA) which recognizes a user voice and provides information or performs an operation corresponding thereto.

A conventional virtual personal assistant initiates voice recognition of a user utterance after a user utterance is completed. However, in order that an operation corresponding to a user intention is executed, a plurality of times of voice recognition are necessary. Accordingly, the response speed of a conventional virtual personal assistant was slow, and thus it has been unpopular among users. This is because it was much more convenient for users to execute an operation with a method other than a voice.

Meanwhile, a virtual personal assistant as described above may be implemented as an artificial intelligence system. An artificial intelligence system is a computer system implementing intelligence of a human level, and it is a system wherein a machine learns, determines, and becomes smarter by itself, unlike conventional rule-based smart systems. An artificial intelligence system shows a more improved recognition rate as it is used more, and becomes capable of understanding user preference more correctly. For this reason, conventional rule-based smart systems are gradually being replaced by deep learning-based artificial intelligence systems.

An artificial intelligence technology consists of machine learning (for example, deep learning) and element technologies utilizing machine learning.

Machine learning refers to an algorithm technology of classifying/learning the characteristics of input data by itself, and an element technology refers to a technology of simulating functions of a human brain such as cognition and determination by using a machine learning algorithm such as deep learning, and includes fields of technologies such as linguistic understanding, visual understanding, inference/prediction, knowledge representation, and operation control.

Examples of various fields to which artificial intelligence technologies are applied are as follows. Linguistic understanding refers to a technology of recognizing languages/characters of humans, and applying/processing them, and includes natural speech processing, machine translation, communication systems, queries and answers, voice recognition/synthesis, and the like. Visual understanding refers to a technology of recognizing an object in a similar manner to human vision, and processing the object, and includes recognition of an object, tracking of an object, search of an image, recognition of humans, understanding of a scene, understanding of a space, improvement of an image, and the like. Inference/prediction refers to a technology of determining information and then making logical inference and prediction, and includes knowledge/probability based inference, optimization prediction, preference based planning, recommendation, and the like. Knowledge representation refers to a technology of automatically processing information of human experiences into knowledge data, and includes knowledge construction (data generation/classification), knowledge management (data utilization), and the like. Operation control refers to a technology of controlling autonomous driving of vehicles and movements of robots, and includes movement control (navigation, collision, driving), operation control (behavior control), and the like.

DISCLOSURE

Technical Problem

The disclosure is for addressing the aforementioned problem, and is aimed at providing an electronic device that is capable of providing a function of a virtual personal assistant that responds in real time during a user utterance, a method for obtaining an utterance intention of a user thereof, and a non-transitory computer-readable recording medium.

Technical Solution

An electronic device according to an embodiment of the disclosure for achieving the aforementioned purpose may include a microphone for receiving a user voice uttered by a user, and a processor configured to obtain an utterance intention of a user on the basis of at least one word included in the user voice while the user voice is being input, provide response information corresponding to the determined utterance intention, and update the response information while the response information is provided, on the basis of an additional word uttered after the at least one word is input.

Meanwhile, the processor may obtain reliability of a plurality of utterance intentions on the basis of the at least one word input, and based on an utterance intention having reliability equal to or greater than a predetermined value being detected among the plurality of utterance intentions, obtain the detected utterance intention as an utterance intention of a user.

Also, the processor may initiate an operation for preparing execution of an application for performing an operation corresponding to an utterance intention having the highest reliability among the plurality of utterance intentions.

Meanwhile, an electronic device according to an embodiment of the disclosure may further include a display, and the processor may, based on an utterance intention having reliability equal to or greater than the predetermined value being detected, control the display to display an execution screen of an application for performing an operation corresponding to the detected utterance intention.

Also, the processor may control the display to display a UI inducing a user to utter additional information necessary for performing an operation corresponding to the detected utterance intention.

In addition, an electronic device according to an embodiment of the disclosure may further include a display. Meanwhile, the processor may, based on the reliability of the plurality of determined utterance intentions being smaller than a predetermined value, control the display to display a list UI including the plurality of determined utterance intentions, and based on a user input selecting an utterance intention among the plurality of displayed utterance intentions being input, provide response information corresponding to the selected utterance intention.

Also, the processor may, based on an utterance intention newly determined based on the additional word being different from an utterance intention determined based on the at least one word, update the provided response information such that response information corresponding to the newly determined utterance intention is provided.

In addition, an electronic device according to an embodiment of the disclosure may further include a display, and the processor may control the display to display the provided response information. The response information may include a name of an entity and an intention.

Meanwhile, a method for obtaining an utterance intention of a user of an electronic device according to an embodiment of the disclosure for achieving the aforementioned purpose may include the steps of receiving a user voice uttered by a user, obtaining an utterance intention of a user on the basis of at least one word included in the user voice while the user voice is being input, providing response information corresponding to the determined utterance intention of a user, and updating the response information while the response information is provided, on the basis of an additional word uttered after the at least one word is input.

Also, the step of obtaining may include the steps of obtaining reliability of a plurality of utterance intentions on the basis of the at least one word input, detecting an utterance intention having reliability equal to or greater than a predetermined value among the plurality of utterance intentions, and obtaining the detected utterance intention as an utterance intention of the user.

Meanwhile, the method for obtaining an utterance intention of a user of an electronic device according to an embodiment of the disclosure may further include the step of initiating an operation for preparing execution of an application for performing an operation corresponding to an utterance intention having the highest reliability among the plurality of utterance intentions.

Also, the method for obtaining an utterance intention of a user of an electronic device may further include the step of, based on an utterance intention having reliability equal to or greater than the predetermined value being detected, displaying an execution screen of an application for performing an operation corresponding to the detected utterance intention.

In addition, the method for obtaining an utterance intention of a user of an electronic device may further include the step of displaying a UI inducing the user to utter additional information necessary for performing an operation corresponding to the detected utterance intention.

Meanwhile, the step of obtaining may further include the step of, based on the reliability of the plurality of determined utterance intentions being smaller than a predetermined value, displaying a list UI including the plurality of determined utterance intentions. Also, the step of providing may include the step of, based on a user input selecting an utterance intention among the plurality of displayed utterance intentions being input, providing response information corresponding to the selected utterance intention.

Further, the step of updating may include the step of, based on an utterance intention newly determined based on the additional word being different from an utterance intention determined based on the at least one word, updating the provided response information such that response information corresponding to the newly determined utterance intention is provided.

Meanwhile, a non-transitory computer-readable recording medium including a program for executing a method for obtaining an utterance intention of a user of an electronic device according to an embodiment of the disclosure for achieving the aforementioned purpose may include a method for obtaining an utterance intention of a user including the steps of receiving a user voice uttered by a user, obtaining an utterance intention of a user on the basis of at least one word included in the user voice while the user voice is being input, providing response information corresponding to the determined utterance intention of a user, and updating the response information while the response information is provided, on the basis of an additional word uttered after the at least one word is input.

Also, the step of providing response information may include the step of displaying the response information. The response information may include a name of an entity and an intention.

Advantageous Effects

According to the various embodiments of the disclosure as described above, the response speed of a conventional virtual personal assistant can be improved, and an operation corresponding to an utterance intention of a user can be performed with minimum conversation patterns.

BEST MODE

Hereinafter, preferred embodiments of the disclosure will be described in detail with reference to the accompanying drawings. In describing the disclosure, in case it is determined that detailed explanation of related known functions or features may unnecessarily confuse the gist of the disclosure, the detailed explanation will be omitted. Also, the terms that will be described below are terms defined in consideration of their functions in the disclosure, and the definition may vary according to the user, operator, or court decisions. Therefore, the definition should be made based on the overall content of this specification.

Meanwhile, terms including ordinal numbers such as the first, the second, and the like may be used to describe various elements, but the elements are not limited by the terms. Such terms are used only to distinguish one element from another element. For example, a first element may be called a second element, and a second element may be called a first element in a similar manner, without departing from the scope of protection of the disclosure. Also, the term and/or includes a combination of a plurality of related items, or any one item among a plurality of related items.

The terms used in this specification are used only to explain the embodiments, and are not intended to restrict and/or limit the disclosure. Also, singular expressions include plural expressions, unless defined obviously differently in the context. Further, in this specification, terms such as include or have should be construed as designating that there are such characteristics, numbers, operations, elements, components or a combination thereof in the specification, but not as excluding the existence or possibility of adding one or more of other characteristics, numbers, operations, elements, components or a combination thereof.

Meanwhile, in the embodiments, 'a module' or 'a unit' may perform at least one function or operation, and may be implemented as hardware or software, or as a combination of hardware and software. Further, a plurality of 'modules' or 'units' may be integrated into at least one module and implemented as at least one processor, excluding 'a module' or 'a unit' that needs to be implemented as specific hardware.

Hereinafter, the disclosure will be described in detail with reference to the accompanying drawings.

Figure 1:
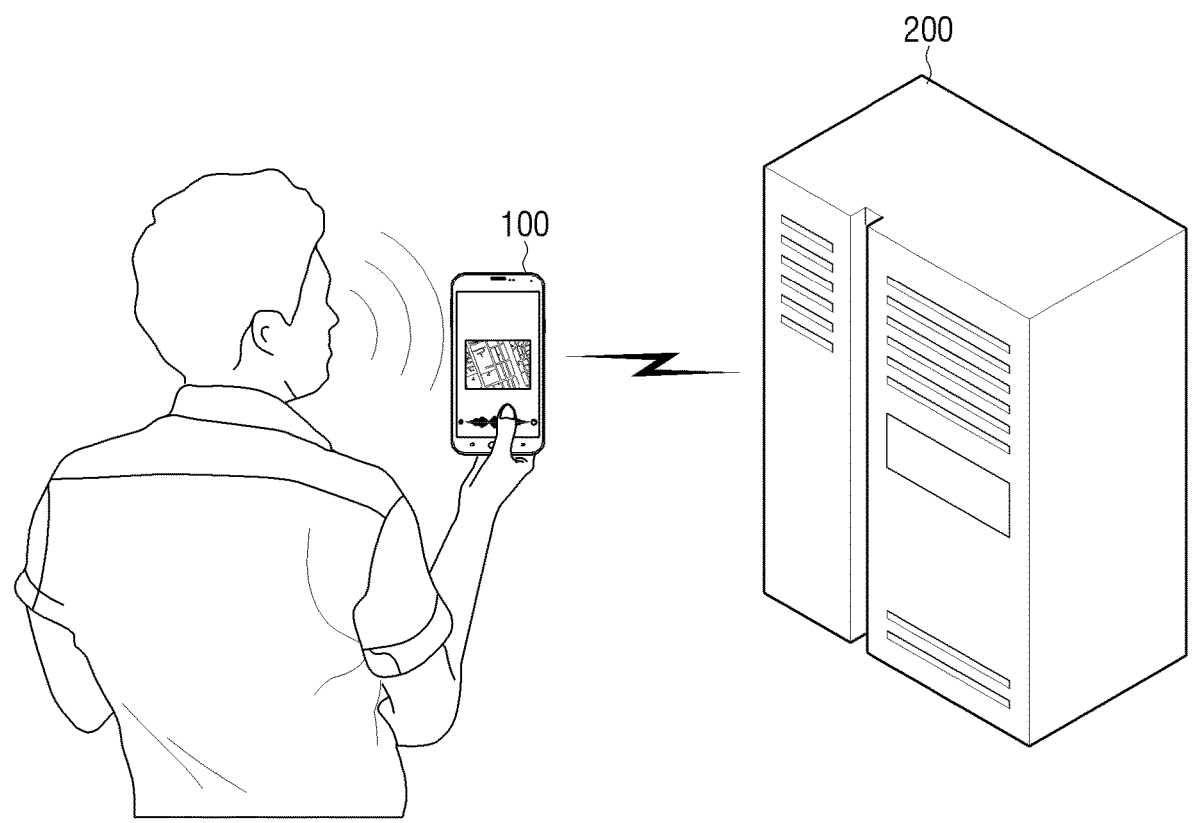
FIG. 1 is a conceptual diagram illustrating a virtual personal assistant system according to an embodiment of the disclosure.

FIG. 1 is a conceptual diagram illustrating a virtual personal assistant system 1000 according to an embodiment of the disclosure. As illustrated in FIG. 1, the virtual personal assistant system 1000 may include an electronic device 100 and a server 200. The electronic device 100 and the server 200 may interwork with each other, and provide a function of a virtual personal assistant to a user.

The term 'a virtual personal assistant' used in this specification refers to a software application that understands a language of a user and performs an instruction that a user requests based on a combination of an artificial intelligence technology and a voice recognition technology. For example, a virtual personal assistant may perform artificial intelligence functions such as machine learning including deep learning, recognition of voices, analysis of sentences, and recognition of circumstances. Also, a virtual personal assistant may learn a user's habit or pattern, and provide a customized service needed for an individual. As examples of a virtual personal assistant, there are S voice and Bixby.

The electronic device 100 may be a mobile device like a smartphone and a tablet PC, but this is merely an embodiment of the disclosure, and the electronic device 100 may be implemented as all kinds of devices that are capable of recognizing a user voice and performing a corresponding operation, such as a voice recognition device, a hub of a home network, an electronic picture frame, a humanoid robot, an audio device, navigation, a smart TV, etc.

Also, the electronic device 100 may recognize a user voice uttered by a user, and understand the language. In addition, the electronic device 100 may manage a conversation with a user, and generate a response.

Meanwhile, the server 200 may provide information that is necessary when the electronic device 100 manages a conversation with a user and generates a response. Also, the server 200 may provide a language model used at the electronic device 100, and update the language model.

As illustrate in the embodiment of FIG. 1, the electronic device 100 and the server 200 may interwork with each other, and provide a function of a virtual personal assistant. However, the disclosure may be implemented in the form of providing a function of a virtual personal assistant only with an operation of the electronic device 100. Also, the disclosure may be implemented in the form wherein the electronic device 100 performs only a role as an input and output device that simply receives a user voice and provides response information, and the server 200 processes most of a function of a virtual personal assistant.

Figure 2:
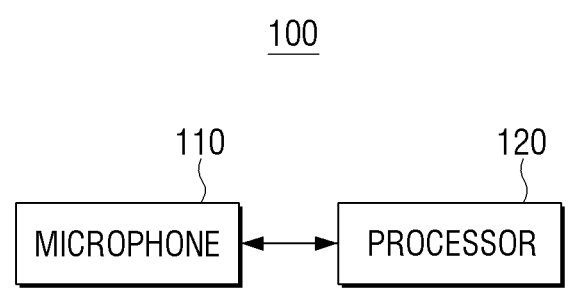
FIG. 2 is a schematic block diagram for illustrating a configuration of an electronic device according to an embodiment of the disclosure.

FIG. 2 is a schematic block diagram for illustrating a configuration of an electronic device 100 according to an embodiment of the disclosure. Referring to FIG. 2, the electronic device 100 may include a microphone 110 and a processor 120.

The microphone 110 may receive a user voice uttered by a user. For example, the microphone 110 may be implemented in an integrated type which is integrated with the direction of the upper side or the front surface, the side surface, etc. of the electronic device 100, or it may be provided as a separate means, and be connected with the electronic device 100 through a wired or wireless interface.

Meanwhile, there may be a plurality of microphones 110, and the microphones 110 may receive voices in different positions from one another, and generate a plurality of voice signals. By using the plurality of voice signals, the electronic device 100 may generate a reinforced single voice signal in a pre-processing process before performing a voice recognition function.

The processor 120 may recognize a user voice input. Also, the processor 120 may perform pre-processing for a user voice input before performing a voice recognition function. For example, pre-processing may include operations such as elimination of noise, extraction of characteristics, etc. A pre-processing process may be performed at the processor 120, or it may be performed through a component separately provided.

In addition, in case an utterance intention of a user can be determined during an utterance of a user, the processor 120 may perform an operation corresponding to the determined utterance intention. Specifically, the processor 120 may measure reliability for a recognition result of a user voice uttered so far. Then, if an intention of a user having reliability equal to or greater than a predetermined value is determined even though an utterance of a user is not finished yet, the processor 120 may provide response information corresponding thereto.

Further, the processor 120 may update response information by using an additional voice uttered after a user voice used for providing response information. The processor 120 may newly determine (obtain) an utterance intention of a user based on the entire user voice to which the additional voice has been added. If it is determined (obtained) that the utterance intention is an identical intention to the determined utterance intention of a user, the processor 120 may provide more precise response information. In contrast, if the utterance intention is a different intention from the determined utterance intention of a user, the processor 120 may replace the provided response information with response information corresponding to the newly determined utterance intention.

For example, by using a result of recognizing an additional voice, the processor 120 may provide response information corresponding to a determined intention of a user more precisely. For example, in case an intention of a user of wishing to be provided with a map for 'Seocho-gu, Seoul' is determined, the processor 120 may recognize an additional user voice 'Gangnam-daero' and provide a map having a higher resolution (i.e., a map of Seocho-gu, Seoul where only the places around Gangnam-daero are enlarged).

As another example, by using a result of recognizing an additional voice, the processor 120 may replace the provided response information with response information corresponding to a newly determined intention of a user, and provide the information. For example, in case an intention of a user of wishing to be provided with a map for 'Seocho-gu, Seoul' is determined, the processor 120 may recognize an additional user voice 'the weather tomorrow' and provide an execution screen of an application providing weather information instead of the provided map information.

Also, the processor 120 may induce a user to utter additional information necessary for performing an operation corresponding to a determined utterance intention. By making a user utter all information necessary for performing an operation within conversation turns in a small number, the processor 120 may prevent generation of additional conversation turns, and enhance the response speed.

For example, in case an utterance intention of a user of wishing to set an alarm is determined, the processor 120 may provide a screen inducing a user utterance for a time set for the alarm, whether to repeat the alarm, etc. which are information necessary for setting of an alarm.

Figure 3:
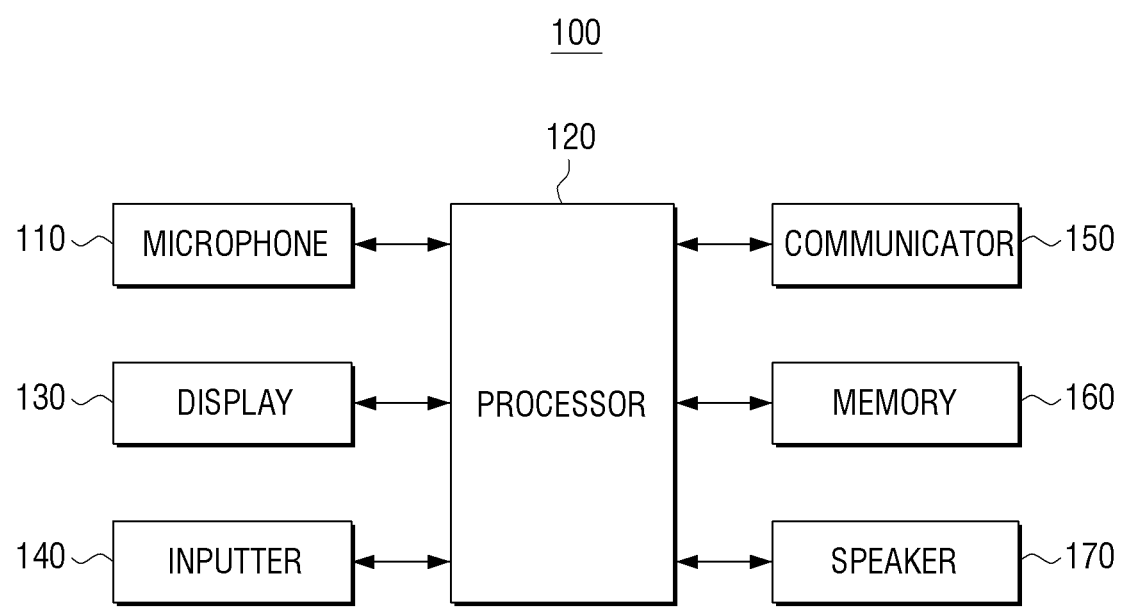
FIG. 3 is a block diagram for illustrating in detail a configuration of an electronic device according to an embodiment of the disclosure.

FIG. 3 is a block diagram for illustrating in detail a configuration of an electronic device 100 according to an embodiment of the disclosure. Referring to FIG. 3, the electronic device 100 may include a microphone 110, a processor 120, a display 130, an inputter 140, a communicator 150, a memory 160 and a speaker 170. In addition to the components illustrated in the embodiment of FIG. 3, the electronic device 100 may also include various components such as an image receiver (not shown), an image processor (not shown), a power supply (not shown), a wired interface (not shown), etc. Also, it is obvious that the electronic device 100 is not limited to be implemented to necessarily include all the components illustrated in FIG. 3.

The microphone 110 may be implemented in various forms, and perform the function of receiving a user voice. Also, the microphone 110 may include various acoustic filters for eliminating noise.

The display 130 may display various types of image contents, information, UIs, etc. provided at the electronic device 100. For example, the display 130 may display a screen providing response information corresponding to a user voice.

Also, the display 130 may be implemented as a liquid crystal display (LCD), an organic light emitting display (OLED), or a plasma display panel (PDP), and display various screens that can be provided through the electronic device 100.

In addition, the display 130 may display an image corresponding to a result of voice recognition by the processor 120. For example, the display 130 may display response information corresponding to an utterance intention determined through a user voice as a text or an image. As another example, the display 130 may display a UI informing additional information necessary for an operation corresponding to an utterance intention. Other than the above, the display 130 may display a UI displaying a list of a plurality of utterance intentions, a text displaying a user voice recognized so far, an execution screen of an application for performing an operation corresponding to an utterance intention, etc.

The inputter 140 receives various user instructions for controlling the electronic device 100. For example, the inputter 140 may receive a user instruction selecting one of a plurality of utterance intentions displayed on a UI. Also, the inputter 140 may be implemented as a button, a motion recognition device, a touch pad, etc. In the embodiment of FIG. 3, the microphone 110 is performing a function of voice input. Accordingly, the inputter 140 may perform a function of receiving the other user instructions excluding the voice input. Also, in case the inputter 140 is implemented as a touch pad, it may be implemented in the form of a touch screen that is combined with the display 130 and constitutes an interlayer structure. The touch screen may detect the position, area, pressure, etc. of a touch input.

The communicator 150 performs communication with an external apparatus. For example, an external apparatus may be implemented as a server 200, a cloud storage, a network, etc. The communicator 150 may transmit a result of voice recognition to an external apparatus, and receive corresponding information from the external apparatus. Also, the communicator 150 may receive a language model for voice recognition from an external apparatus.

For this, the communicator 150 may include various communication modules such as a near field wireless communication module (not shown), a wireless communication module (not shown), etc. Here, a near field wireless communication module is a module for performing communication with an external apparatus located within a short distance, according to a near field wireless communication method such as Bluetooth and Zigbee. Meanwhile, a wireless communication module is a module that is connected to an external network according to a wireless communication protocol such as WiFi, WiFi direct, and IEEE, and performs communication. In addition to the above, a wireless communication module may further include mobile communication modules that are connected to a mobile communication network according to various mobile communication standards such as 3rd Generation (3G), 3rd Generation Partnership Project (3GPP), Long Term Evolution (LTE), LTE Advanced (LTE-A), and the like, and perform communication.

The memory 160 may store various modules, software, and data for operating the electronic device 100. For example, the memory 160 may store an acoustic model (AM) and a language model (LM) that can be used in recognizing a user voice.

The memory 160 is a storage medium storing various types of programs necessary for operating the electronic device 100, and it may be implemented in forms such as a flash memory, a hard disk drive (HDD), a solid state drive (SDD), etc. For example, the memory 160 may include a ROM for storing a program for performing of an operation by the electronic device 100, and a RAM for temporarily storing data according to performing of an operation by the electronic device 100.

Also, in the memory 160, programs and data for constituting various screens to be displayed on the display 130 may be stored. Also, the memory 160 may store programs, applications, and data for performing specific services. For example, in the memory 160, a map application, an application for reserving transportation means, a music application, a schedule management application, etc. may be stored.

Meanwhile, the memory 160 may have stored in advance various types of response messages corresponding to user voices as voice or text data. The electronic device 100 may read at least one of a voice or text data corresponding to a received user voice (in particular, a control command from a user) from the memory 160, and output it through the display 130 or the speaker 170.

The speaker 170 may output sound. For example, the speaker 170 may output not only various types of audio data but also alarming sound or voice messages. An electronic device 100 according to an embodiment of the disclosure may include the speaker 170 as one of output units for providing an interactive voice recognition function. Through the speaker, the electronic device 100 may provide a user with a user experience like conversing with the electronic device 100. The speaker 170 may be installed inside the electronic device 100, or it may be implemented in a form such as an output port like a jack, etc.

The processor 120 may control the aforementioned components of the electronic device 100. For example, the processor 120 may control the display 130 to display an execution screen of an application performing an operation corresponding to a determined utterance intention of a user.

The processor 120 may be implemented as a single CPU and perform a voice recognition operation, a language understanding operation, a conversation management operation, a response generation operation, etc., or it may be implemented as a plurality of processors and an IP performing a specific function. Also, the processor 120 may perform voice recognition based on a traditional hidden Markov model (HMM), or perform voice recognition based on deep learning like a deep neural network (DNN).

Further, the processor 120 may use big data and history data of each user in voice recognition and measurement of reliability. Through this, the processor 120 may use a voice recognition model trained with big data, and at the same time, personalize the voice recognition model. For example, the processor 120 may determine reliability of a name of an entity by using a trained acoustic model (AM), and determine reliability of an intention by using a trained language model (LM).

Also, the processor 120 may recognize a user voice in real time. In addition, the processor 120 may determine an utterance intention of a user by using an intermediate recognition result recognized so far. For example, the processor 120 may determine an utterance intention of a user based on at least one word (a keyword) included in a user voice.

Then, the processor 120 may perform an operation corresponding to the determined utterance intention. For example, the processor 120 may provide response information corresponding to the determined utterance intention. As another example, the processor 120 may execute an application for performing an operation corresponding to the determined utterance intention.

Further, the processor 120 may update response information from a user voice additionally uttered after intermediate recognition processing for a user voice proceeded. That is, the processor 120 may recognize again a user voice additionally input while an operation corresponding to an utterance intention is performed (e.g., while response information is provided) along with a user voice previously input. Accordingly, the processor 120 may determine whether an utterance intention of a user determined by intermediate recognition processing is correct.

For example, the processor 120 may update response information based on an additional word uttered after at least one word is input while response information is provided. In case an utterance intention of a user determined based on an additional word coincides with the previously determined utterance intention, the processor 120 may provide more precise information. In contrast, in case an utterance intention does not coincide with the previously determined utterance intention, the processor 120 may provide response information corresponding to an utterance intention of a user determined based on an additional word, instead of the previous response information.

In addition, the processor 120 may recognize a user voice in real time, and select a plurality of candidate utterance intentions from the recognized user voice. If one of the plurality of candidate utterance intentions has a value equal to or greater than predetermined reliability, the processor 120 may determine the utterance intention having a value equal to or greater than predetermined reliability as the utterance intention of a user. Also, by monitoring in real time whether an utterance intention of a user can be determined only with a user voice recognized so far, the processor 120 may reduce time spent for responding to a user.

Meanwhile, the processor 120 may statistically determine the information that a user wishes to search or the operation that a user wishes to execute in case a specific word is input, by using big data and voice data that was received from a user and was stored. A quantified value of such statistical determination is reliability. For example, the processor 120 may determine reliability of a name of an entity by using a trained acoustic model (AM), and determine reliability of an intention by using a trained language model (LM).

Also, for providing a quick response, the processor 120 may prepare an operation corresponding to an utterance intention of a user in advance. In addition, the processor 120 may initiate an operation for preparing execution of an application for performing an operation corresponding to an utterance intention having the highest reliability among a plurality of candidate utterance intentions. For example, if an utterance intention having the highest reliability is searching the location of an office located in Seocho-gu, Seoul, the processor 120 may execute a map application, or activate a GPS function of the electronic device 100.

If reliability of one of a plurality of candidate utterance intentions is equal to or greater than a predetermined value, the processor 120 may determine the utterance intention as the utterance intention of a user. Then, the processor 120 may control the display 130 to display an execution screen of an application for performing an operation corresponding to the determined utterance intention.

In addition, in case there is additional information necessary for performing an operation corresponding to the determined utterance intention, the processor 120 may control the display 130 to display a UI inducing a user to utter a voice including the additional information. Through this, the processor 120 may prevent generation of additional conversation turns, and induce a user to utter all information in the conversation turn this time.

If reliability of all of a plurality of candidate utterance intentions is smaller than a predetermined value, the processor 120 may display a UI including the plurality of candidate utterance intentions, and make a user select an utterance intention directly. Then, the processor 120 may perform an operation corresponding to the utterance intention selected by the user. Such an embodiment may be used more usefully in case only a simple name of an entity is recognized, instead of a sentence for which an intention can be determined from a user voice.

The more detailed operations of the processor 120 will be described again below, with reference to an exemplary drawing.

Figure 4:
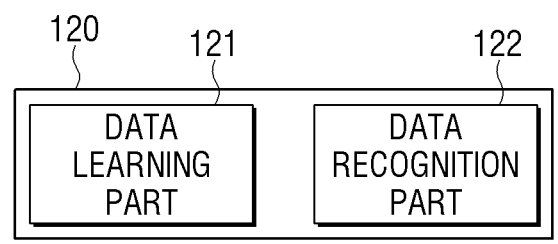
FIG. 4 is a block diagram of a processor according to some embodiments of the disclosure.

FIG. 4 is a block diagram of a processor 120 according to some embodiments of the disclosure. Referring to FIG. 4, the processor 120 according to some embodiments of the disclosure may include a data learning part 121 and a data recognition part 122. Meanwhile, the processor 120 may be included in the electronic device 100, or in the server 200.

Depending on the forms of embodiment, at least a portion of the data learning part 121 and at least a portion of the data recognition part 122 may be implemented as a software module, or manufactured in the form of a hardware chip, and installed on the electronic device 100 or the server 200.

The data learning part 121 may learn standards for voice recognition, understanding of a language, and determination of an utterance intention of a user. The processor 120 may analyze a user voice input according to a learned standard and determine an utterance intention of a user, and generate corresponding response information. Also, the data learning part 121 may determine which data is to be used for recognizing a user voice. In addition, the data learning part 121 may understand a recognized user voice and determine which data is to be used for obtaining an utterance intention of a user. Further, the data learning part 121 may acquire data to be used for learning, and apply the acquired data to a data recognition model that will be described below, and thereby learn standards for voice recognition and determination of an utterance intention of a user. To be specific, the data learning part 121 may acquire data to be used for learning from another external server or electronic device. Meanwhile, the data recognition part 122 may use a trained data recognition model, and recognize a circumstance from specific data. The data recognition part 122 may acquire specific data according to a predetermined standard by learning, and use a data recognition model while using the acquired data as an input value. For example, by using a trained acoustic model and a trained language model, the data recognition part 122 may recognize a user voice input. Then, the data recognition part 122 may determine an utterance intention of a user based on the recognized user voice. Further, the data recognition part 122 may update the data recognition model by using the data acquired as the result value of voice recognition and an utterance intention for each user as an input value again. As described above, the data recognition part 122 may use big data and history data for each user in voice recognition and measurement of reliability for an utterance intention, etc. The processor 120 may use a voice recognition model trained with big data, and at the same time, personalize the voice recognition model.

At least one of the data learning part 121 or the data recognition part 122 may be manufactured in the form of one or a plurality of hardware chips, and installed on the electronic device 100. For example, at least one of the data learning part 121 or the data recognition part 122 may be manufactured in the form of a dedicated hardware chip for artificial intelligence (AI), or as a portion of a generic-purpose processor (e.g., a CPU or an application processor) or a graphic-dedicated processor (e.g.,: a GPU), and installed on the aforementioned various types of electronic devices 100. Here, a dedicated hardware chip for artificial intelligence is a dedicated processor specialized in probability operations, and it has higher performance in parallel processing than conventional generic-purpose processors, and is capable of processing operation works swiftly in the field of artificial intelligence like machine learning. In the embodiment of FIG. 4, a case wherein both of the data learning part 121 and the data recognition part 122 are installed on the electronic device 100 was illustrated, but they may be installed on separate devices. For example, one of the data learning part 121 or the data recognition part 122 may be included in the electronic device 100, and the other may be included in the server 200. Also, the data learning part 121 and the data recognition part 122 may be connected with each other by wire or wirelessly, and the model information constructed by the data learning part 121 may be provided to the data recognition part 122, and the data input to the data recognition part 122 may be provided to the data learning part 121 as additional learning data.

For example, the electronic device 100 may include the data recognition part 122, and an external server 200 may include the data learning part 121. The server 120 may learn a standard for obtaining a user intention, and the electronic device 100 may determine the intention of a voice uttered by a user based on the learning result by the server 200.

Meanwhile, the data learning part 121 of the server 200 may learn a standard for which data is to be used for obtaining a user intention, and how to determine a user intention by using data. The data learning part 121 may acquire data to be used for learning, and apply the acquired data to a data recognition model that will be described later, and thereby learn a standard to determine a user intention.

However, this is merely an embodiment, and the electronic device 100 may include the data learning part 121, and an external device like a server may include the data recognition part 122.

Meanwhile, at least one of the data learning part 121 or the data recognition part 122 may be implemented as a software module. In case one of the data learning part 121 or the data recognition part 122 is implemented as a software module (or, a program module including instructions), the software module may be stored in a non-transitory computer-readable recording medium. Also, at least one software module may be provided by an operating system (OS), or by a specific application. Alternatively, a portion of at least one software module may be provided by an OS, and the other portions may be provided by a specific application.

Figure 5A:
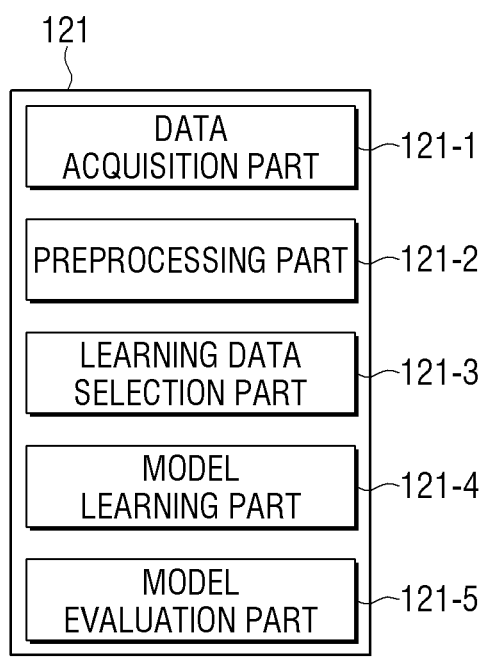
FIG. 5A is a block diagram of a data learning part according to some embodiments of the disclosure.

FIG. 5A is a block diagram of a data learning part 121 according to some embodiments of the disclosure. Referring to FIG. 5A, the data learning part 121 according to some embodiments may include a data acquisition part 121-1, a preprocessing part 121-2, a leaning data selection part 121-3, a model learning part 121-4, and a model evaluation part 121-5.

The data acquisition part 121-1 may acquire data necessary for determination of a circumstance. For example, the data acquisition part 121-1 may convert a user voice signal input through a microphone 110 into a digital signal, and thereby acquire voice data. Also, the data acquisition part 121-1 may receive voice data for learning from a server 200 or a network like the Internet.

The preprocessing part 121-2 may preprocess the acquired data so that the acquired data can be used for learning for determination of a circumstance. Also, the preprocessing part 121-2 may process the acquired data in a predetermined format, so that the model learning part 121-4 that will be described later can use the acquired data for learning for determination of a circumstance.

For example, the preprocessing part 121-2 may extract a section which is a subject for voice recognition with respect to a user voice input. Then, the preprocessing part 121-2 may generate voice data by performing elimination of noise, extraction of characteristics, etc.

As another example, the preprocessing part 121-2 may generate voice data to be appropriate for voice recognition by a method of analyzing frequency components of a user voice input and reinforcing some of the frequency components, and suppressing the other frequency components.

The learning data selection part 121-3 may select a piece of data necessary for learning among the preprocessed data. The selected data may be provided to the model learning part 121-4. The learning data selection part 121-3 may select a piece of data necessary for learning among the preprocessed data according to a predetermined standard for determination of a circumstance. Also, the learning data selection part 121-3 may select data according to a predetermined standard by learning by the model learning part 121-4 that will be described later.

For example, in the initial stage of learning, the learning data selection part 121-3 may eliminate pieces of voice data having high similarity among the preprocessed voice data. That is, for initial learning, the learning data selection part 121-3 may select pieces of voice data having low similarity so that a standard that is easy to be distinguished can be learned.

As another example, the learning data selection part 121-3 may select only voice data uttered in a specific language. As different languages have different utterance characteristics, the learning data selection part 121-3 may make the model learning part 121-4 learn a standard appropriate for the selected specific language, by selecting a voice data set uttered in a specific language.

In contrast, the learning data selection part 121-3 may select voice data to which characteristics of each language have been applied. Through this, the model learning part 121-4 may learn a standard for which language the voice data belongs to.

For example, the learning data selection part 121-3 may select only voice data of a specific user, and make the model learning part 121-4 learn a standard for speaker dependent or speaker adoption recognition.

Also, the learning data selection part 121-3 may select preprocessed pieces of voice data that commonly satisfy one of the predetermined standards by learning. Through this, the model learning part 121-4 may learn another standard that is different from the standards already learned.

The model learning part 121-4 may learn a standard for how to determine a circumstance based on learning data. In addition, the model learning part 121-4 may learn a standard for which learning data is to be used for determination of a circumstance.

For example, the model learning part 121-4 may compare a plurality of pieces of voice data and learn physical characteristics distinguishing phonemes, syllables, vowels, etc. Through this, the model learning part 121-4 may construct an acoustic model (AM) distinguishing sound units like phonemes. Also, the model learning part 121-4 may compare a plurality of pieces of voice data, and learn words or lexical usages. Through this, the model learning part 121-4 may construct a language model (LM).

The model learning part 121-4 may train a data recognition model used for determination of a circumstance by using learning data. In this case, the data recognition model may be a model that was constructed in advance. For example, the data recognition model may be a model that received basic learning data (e.g., sample voice data, etc.), and was constructed in advance. As another example, the data recognition model may be an acoustic model (AM) or a language model (LM) that was constructed in advance by using big data. The model learning part 121-4 may learn voice data of a specific user, and develop an acoustic model (AM) or a language model (LM) that was constructed in advance and is speaker independent to a personalized acoustic model (AM) or a personalized language model (LM).

The data recognition model may be constructed in consideration of the field to which the recognition model is applied, the purpose of learning, or the computer performance of a device, and the like. Also, the data recognition model may be designed to simulate a human brain structure on a computer. In addition, the data recognition model may include a plurality of network nodes having weights that simulate neurons of the neural network of a human. The plurality of network nodes may each form a connection relationship so as to simulate synaptic activities of neurons exchanging signals via synapses. Further, the data recognition model may include, for example, a neural network model, or a deep learning model developed from a neural network model. In a deep learning model, a plurality of network nodes may be located in different depths (or, layers) from one another, and exchange data according to a relationship of convolution connection. The data recognition model may include, for example, models like a deep neural network (DNN), a recurrent neural network (RNN), a bidirectional recurrent deep neural network (BRDNN), and the like, but is not specifically limited to the aforementioned examples. According to various embodiments, in case there are a plurality of data recognition models constructed in advance, the model learning part 121-4 may determine a data recognition model wherein correlation between input learning data and basic learning data is big as a data recognition model to be trained. In this case, the basic learning data may have been classified in advance according to the types of data, and the data recognition models may have been constructed in advance according to the types of data. For example, the basic learning data may have been classified in advance according to various standards like the area where the learning data was generated, the time when the learning data was generated, the size of the learning data, the genre of the learning data, the generator of the learning data, the types of objects in the learning data, etc.

In addition, the model learning part 121-4 may train a data recognition model by using, for example, a learning algorithm including error back-propagation or gradient descent, and the like.

For example, the model learning part 121-4 may train a data recognition model through supervised learning of which input value is learning data. As another example, the model learning part 121-4 may train a data recognition model through unsupervised learning which finds a standard for determination of a circumstance by learning the types of data necessary for determination of a circumstance by itself without a separate map. As still another example, the model learning part 121-4 may train a data recognition model through reinforcement learning that uses a feedback regarding whether a result of determination of a circumstance according to learning is correct.

Further, when a data recognition model is trained, the model learning part 121-4 may store the trained data recognition model. In this case, the model learning part 121-4 may store the trained data recognition model in the memory 160 of the electronic device 100. Alternatively, the model learning part 121-4 may store the trained data recognition model in the memory of the server 200 that is connected to the electronic device 100 by wire or through a wireless network.

In this case, the memory 160 wherein the trained data recognition model is stored may also store an instruction or data related to at least one other component of the electronic device 100. Also, the memory 160 may store software and/or a program. For example, a program may include a kernel, middleware, an application programming interface (API) and/or an application program (or "an application"), and the like.

The model evaluation part 121-5 may input evaluation data to a data recognition model, and in case the recognition result output from the evaluation data does not satisfy a predetermined standard, make the model learning part 121-4 learn again. In this case, the evaluation data may be predetermined data for evaluating a data recognition model.

In the initial step of constructing a recognition model, evaluation data may be voice data including phonemes having different physical characteristics. Afterwards, the evaluation data may be replaced with a voice data set of which similarity becomes more and more consistent. Through this, the model evaluation part 121-5 may gradually verify the performance of a data recognition model.

For example, in case the number or ratio of pieces of evaluation data of which recognition results are not correct exceeds a predetermined threshold value, among the recognition results of a trained data recognition model with respect to evaluation data, the model evaluation part 121-5 may evaluate that the data recognition model does not satisfy a predetermined standard. For example, in case a predetermined standard is defined as a ratio of 2%, and the trained data recognition model outputs incorrect recognition results with respect to pieces of evaluation data exceeding 20 among 1000 pieces of evaluation data in total, the model evaluation part 121-5 may evaluate that the trained data recognition model is not appropriate.

Meanwhile, in case there are a plurality of trained data recognition models, the model evaluation part 121-5 may evaluate with respect to each of the trained voice recognition models whether it satisfies a predetermined standard, and determine a model satisfying a predetermined standard as a final data recognition model. In this case, if there are a plurality of models satisfying a predetermined standard, the model evaluation part 121-5 may determine a model or a specific number of models set in advance in the order of having a higher evaluation score as a final data recognition model.

Meanwhile, at least one of the data acquisition part 121-1, the preprocessing part 121-2, the learning data selection part 121-3, the model learning part 121-4, or the model evaluation part 121-5 in the data learning part 121 may be manufactured in the form of at least one hardware chip, and installed on the electronic device. For example, at least one of the data acquisition part 121-1, the preprocessing part 121-2, the learning data selection part 121-3, the model learning part 121-4, or the model evaluation part 121-5 may be manufactured in the form of a dedicated hardware chip for artificial intelligence (AI), or as a conventional generic-purpose processor (e.g., a CPU or an application processor) or as a portion of an IP for a specific function, and installed on the aforementioned various types of electronic devices 100.

Also, the data acquisition part 121-1, the preprocessing part 121-2, the learning data selection part 121-3, the model learning part 121-4, and the model evaluation part 121-5 may be installed on one electronic device, or respectively installed on separate electronic devices. For example, some of the data acquisition part 121-1, the preprocessing part 121-2, the learning data selection part 121-3, the model learning part 121-4, and the model evaluation part 121-5 may be included in the electronic device 100, and the others may be included in the server 200.

Meanwhile, at least one of the data acquisition part 121-1, the preprocessing part 121-2, the learning data selection part 121-3, the model learning part 121-4, or the model evaluation part 121-5 may be implemented as a software module. In case at least one of the data acquisition part 121-1, the preprocessing part 121-2, the learning data selection part 121-3, the model learning part 121-4, or the model evaluation part 121-5 is implemented as a software module (or, a program module including instructions), the software module may be stored in a non-transitory computer-readable recording medium. Also, at least one software module may be provided by an operating system (OS), or by a specific application. Alternatively, a portion of at least one software module may be provided by an OS, and the other portions may be provided by a specific application.

Figure 5B:
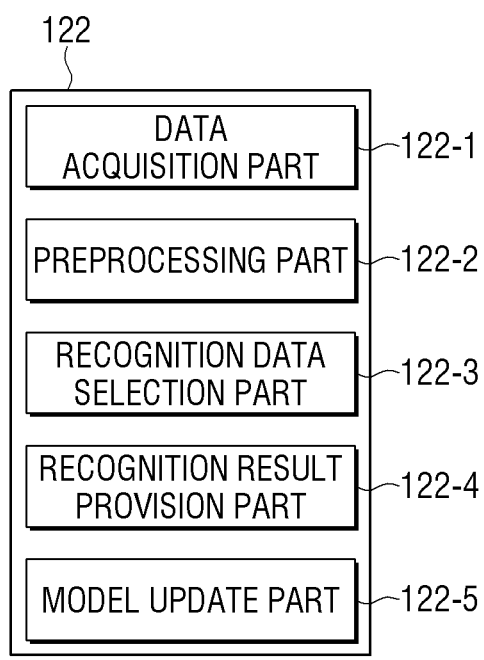
FIG. 5B is a block diagram of a data recognition part according to some embodiments of the disclosure.

FIG. 5B is a block diagram of a data recognition part 122 according to some embodiments of the disclosure.

Referring to FIG. 5B, the data recognition part 122 according to some embodiments of the disclosure may include a data acquisition part 122-1, a preprocessing part 122-2, a recognition data selection part 122-3, a recognition result provision part 122-4, and a model update part 122-5.

The data acquisition part 122-1 may acquire data necessary for determination of a circumstance. The preprocessing part 122-2 may preprocess the acquired data so that the acquired data can be used for determination of a circumstance. Also, the preprocessing part 122-2 may process the acquired data in a predetermined format, so that the recognition result provision part 122-4 that will be described later can use the acquired data for determination of a circumstance.

The recognition data selection part 122-3 may select pieces of data necessary for determination of a circumstance among the pieces of preprocessed data. The selected data may be provided to the recognition result provision part 122-4. Also, the recognition data selection part 122-3 may select some or all of the pieces of preprocessed data according to a predetermined standard for determination of a circumstance. In addition, the recognition data selection part 122-3 may select data according to a predetermined standard by learning by the model learning part 142-4 that will be described later.

The recognition result provision part 122-4 may apply the selected data to a data recognition model and determine a circumstance. Also, the recognition result provision part 122-4 may provide a recognition result according to the purpose of data recognition. By using the data selected by the recognition data selection part 122-3 as an input value, the recognition result provision part 122-4 may apply the selected data to a data recognition model. Also, a recognition result may be determined by a data recognition model.

For example, the recognition result provision part 122-4 may recognize a user utterance input according to a standard for classification determined at a data recognition model. Then, the recognition result provision part 122-4 may make the processor 120 determine an utterance intention of a user based on the recognized user voice. As another example, the recognition result provision part 122-4 may recognize a keyword in a user utterance input by using a data recognition model. Based on the recognized keyword, the processor 120 may perform an operation corresponding to the utterance intention of a user. Then, the processor 120 may induce the user to utter a keyword including additional information necessary for performing an operation.

The model update part 122-5 may make a data recognition model updated based on evaluation of a recognition result provided by the recognition result provision part 122-4. For example, the model update part 122-5 may provide a recognition result provided by the recognition result provision part 122-4 to the model learning part 141-4, and thereby make the model learning part 141-4 update a data recognition model.

Meanwhile, at least one of the data acquisition part 122-1, the preprocessing part 122-2, the recognition data selection part 122-3, the recognition result provision part 122-4, or the model update part 122-5 in the data recognition part 122 may be manufactured in the form of at least one hardware chip, and installed on the electronic device. For example, at least one of the data acquisition part 122-1, the preprocessing part 122-2, the recognition data selection part 122-3, the recognition result provision part 122-4, or the model update part 122-5 may be manufactured in the form of a dedicated hardware chip for artificial intelligence (AI), or as a conventional generic-purpose processor (e.g., a CPU or an application processor) or as a portion of an IP for a specific function, and installed on the aforementioned various types of electronic devices 100.

Also, the data acquisition part 122-1, the preprocessing part 122-2, the recognition data selection part 122-3, the recognition result provision part 122-4, and the model update part 122-5 may be installed on one electronic device, or respectively installed on separate electronic devices. For example, some of the data acquisition part 122-1, the preprocessing part 122-2, the recognition data selection part 122-3, the recognition result provision part 122-4, and the model update part 122-5 may be included in the electronic device 100, and the others may be included in the server 200.

Meanwhile, at least one of the data acquisition part 122-1, the preprocessing part 122-2, the recognition data selection part 122-3, the recognition result provision part 122-4, or the model update part 122-5 may be implemented as a software module. In case at least one of the data acquisition part 122-1, the preprocessing part 122-2, the recognition data selection part 122-3, the recognition result provision part 122-4, or the model update part 122-5 is implemented as a software module (or, a program module including instructions), the software module may be stored in a non-transitory computer-readable recording medium. Also, at least one software module may be provided by an operating system (OS), or by a specific application. Alternatively, a portion of at least one software module may be provided by an OS, and the other portions may be provided by a specific application.

Hereinafter, the operation of the processor 120 will be described in more detail with reference to the drawings.

According to an embodiment of the disclosure, the processor 120 may determine an utterance intention of a user on the basis of at least one word included in a user voice while the user voice is being input. Specifically, at least one word included in a user voice may include a word representing an intent and a word representing a name of an entity (a slot). A name of an entity refers to a word from which information such as a place, a type, time, a departure, a destination, and the like can be figured out. For example, in the case of a user voice "I'm hungry. Is there a good steak house near Seoul Station?," 'hungry' may be classified as a word representing an intent. Meanwhile, words like 'Seoul Station' and 'steak' may be classified as words representing names of entities.

The processor 120 may determine an operation corresponding to a user voice based on reliability of each word representing an intent and a name of an entity. For example, if reliability of all words representing intents and names of entities is smaller than a predetermined value, the processor 120 may wait for a user voice to be additionally input.

If reliability for a specific intent becomes equal to or greater than a predetermined value, the processor 120 may initiate preparation for execution of an operation corresponding to the specific intent. Then, the processor 120 may control the display 130 to display a name of an entity additionally needed for execution of an operation.

Meanwhile, if reliability for a specific name of an entity becomes equal to or greater than a predetermined value, the processor 120 may control the display 130 to display a plurality of candidate utterance intentions related to the specific name of an entity.

In case reliability for an intent and a name of an entity is equal to or greater than a predetermined value and response information is displayed on the display 130, the processor 120 may update the response information by using a user voice additionally uttered. If there is no change in the reliability value, the processor 120 may maintain the response information currently displayed on the display 130. In contrast, if there is a change in the reliability value, the processor 120 may update the response information currently displayed on the display 130. That is, the processor 120 may control the display 130 to display updated response information.

Figure 6:
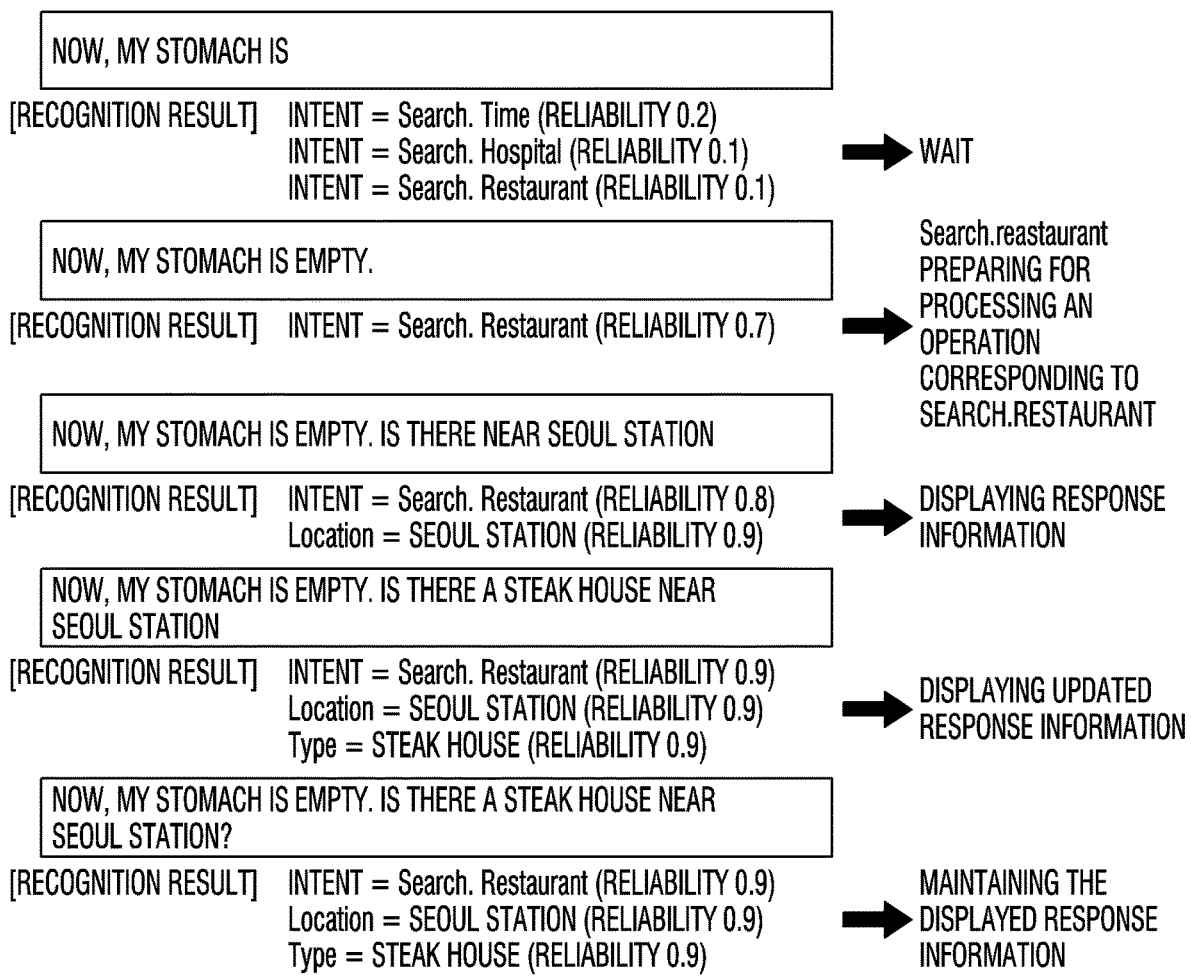
FIG. 6 is a diagram illustrating an embodiment of providing/recognizing response information by using reliability of a word representing an intention.

FIG. 6 is a diagram illustrating an embodiment wherein response information is updated as a word representing an intent is recognized first, and then a word representing a name of an entity is additionally recognized. In the embodiment of FIG. 6, description will be made based on the assumption that a predetermined value of reliability which is a threshold value for displaying response information is 0.8. Also, a case wherein a threshold value for preparation of a corresponding operation is set as 0.7 will be assumed. As described above, in the embodiment of FIG. 6, a case wherein two threshold values are set was illustrated, but only one threshold value may be set. Also, in case a corresponding operation may be prepared through several steps, the processor 120 may set a plurality of threshold values, and may use the values as triggers for proceeding each step.

The processor 120 may generate a model for measuring reliability for determination of reliability based on big data and user history data. For example, in generating a model for measuring reliability, the aforementioned data learning part 121 and the data recognition part 122 may be used.

Referring to FIG. 6, the processor 120 may extract a plurality of utterance intentions from a user voice "Now, my stomach is" that a user uttered so far. For example, the processor 120 may extract an intent of asking time (Search-.Time) from the word "now." Also, the processor 120 may extract an intent of searching a hospital (Search.Hospital) and an intent of searching a restaurant (Search. Restaurant) from the word "stomach is." Then, the processor 120 may respectively determine reliability of the plurality of extracted utterance intentions. As all of the determined reliability is smaller than 0.8 which is a predetermined value, the processor 120 may wait until an additional user voice is input.

Then, based on the user additionally uttering as much as "Now, my stomach is empty," the processor 120 may determine that the utterance intention of the user is closest to an intent of searching a restaurant (Search. Restaurant). The processor 120 may determine reliability from the user voice uttered so far. As the determined reliability is 0.7, the processor 120 may initiate preparation for processing an operation of searching a restaurant. For example, the processor 120 may execute a map application, or activate a GPS function.

Until the user's utterance is completed, the processor 120 may re-recognize both a user voice intermediately recognized and a user voice additionally uttered after intermediate recognition. Based on the re-recognized user voices, the processor 120 may find an intent and a name of an entity, and determine the reliability of each of them again.

Then, based on the user voice input as much as "Now, my stomach is empty. Is there near Seoul Station," the processor 120 may adjust the reliability of an intent of searching a restaurant (Search.Restaurant) as 0.8, and extract 'Seoul Station' which is a name of an entity related to a location. In the embodiment of FIG. 6, it was set that response information is provided if the reliability of an intent is equal to or greater than 0.8, and thus the processor 120 may control the display 130 to display response information corresponding to the determined utterance intention of a user. For example, the processor 120 may execute a map application for searching a restaurant, and may set the searched area of the map application as 'Seoul Station' by using the extracted name of an entity 'Seoul Station.' Then, the processor 120 may control the display 130 to display an execution screen of an application providing map information around Seoul Station.

Further, based on the user voice input as much as "Now, my stomach is empty. Is there a steak house near Seoul Station," the processor 120 may additionally extract 'a steak house' which is a name of an entity related to a type. Then, the processor 120 may update response information on the basis of the additionally uttered word. For example, the processor 120 may update an execution screen of an application displaying map information around Seoul Station that is being provided as response information to a screen displaying arrows on locations corresponding to steak houses.

Then, based on the user voice input as much as "Now, my stomach is empty. Is there a steak house near Seoul Station?," the processor 120 may determine that there is no additionally extracted intent or name of an entity, and there is no change in a previously determined intent or name of an entity. As the determined utterance intentions of a user are identical and no additional information was input, the processor 120 may maintain the response information provided. As described above, the processor 120 may already determine an utterance intention of a user before a user's utterance is completed. Accordingly, the processor 120 may reduce time spent for providing response information to a user.

Figure 7:
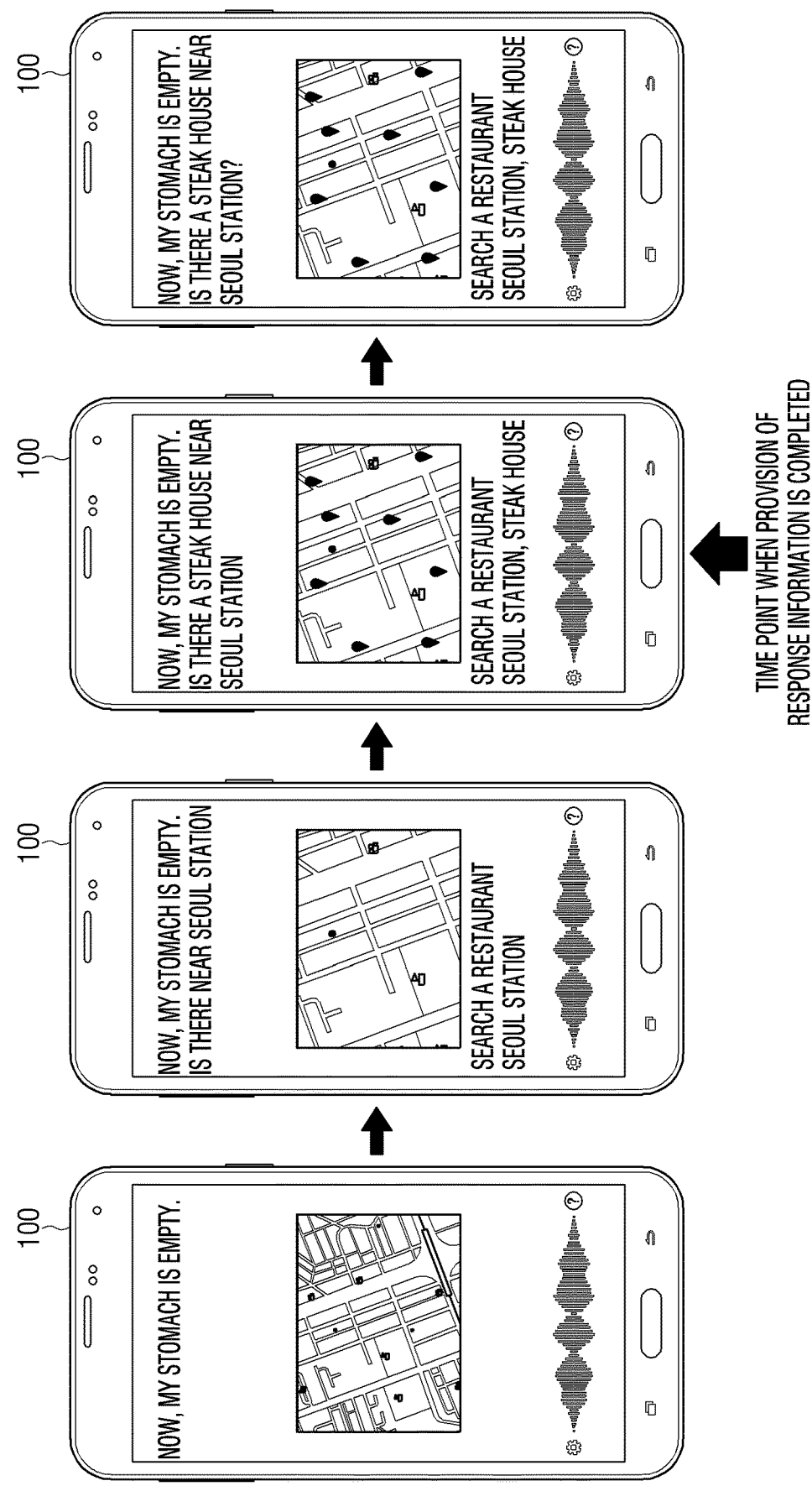
FIG. 7 is a diagram illustrating a screen provided according to the embodiment of FIG. 6.

FIG. 7 is a diagram illustrating a screen provided through the display 130 according to the embodiment of FIG. 6. In FIG. 6, an embodiment wherein the electronic device 100 was implemented as a smartphone was illustrated. In FIG. 7, the electronic device 100 was illustrated from the left to the right according to the chronological order.

In the embodiment of FIG. 7, the processor 120 controls the display 130 to display a user voice recognized so far as a text in the upper part of the display 130. Also, the processor 120 controls the display 130 to display an image notifying that a voice recognition function was activated in the lower part of the display 130. Further, the processor 120 controls the display 130 to display response information in the center of the display 130. Meanwhile, all embodiments of the disclosure are obviously not limited to having the same configuration and composition as the arrangement of the screen in FIG. 7.

The electronic device 100 illustrated in the leftmost portion of FIG. 7 is preparing for processing of a corresponding operation. On the basis of a user voice "Now, my stomach is empty" recognized so far, the processor 120 may determine that the intent of the user voice is an intent of searching a restaurant. As the reliability of an intent of searching a restaurant is determined to be equal to or greater than a threshold value for preparation of a corresponding operation, the processor 120 may execute a map application for preparing provision of response information.

The electronic device 100 illustrated as the second device from the left in FIG. 7 determined that there is an utterance intention having reliability equal to or greater than a threshold value for displaying response information. A text corresponding to an utterance intention and a name of an entity of which reliability is equal to or greater than a predetermined value may be displayed in the lower part of an execution screen of a map application. By showing the determined intent and name of an entity to a user, the processor 120 has an effect of being able to receive a user feedback. Also, the processor 120 may provide map information around Seoul Station which is a response screen corresponding to the determined intent and name of an entity.

The electronic device 100 illustrated as the third device from the left in FIG. 7 updated response information by using words included in an additionally uttered voice of a user. The processor 120 may recognize the additionally uttered voice of a user, and extract information of the type of a restaurant to be searched. Further, the processor 120 may update the map information around Seoul Station that was being provided to map information displaying locations of steak houses.

The electronic device 100 illustrated in the rightmost portion of FIG. 7 recognized an additionally uttered voice of a user, but there is no change in the reliability, and also, there is no additionally recognized name of an entity, etc. Thus, the response information screen that was previously provided is maintained. Accordingly, response information that the user actually wishes to receive was already provided at the time point when the electronic device was illustrated as the third device from the left in FIG. 7. That is, the electronic device 100 according to an embodiment of the disclosure may recognize a user voice in real time even before input of a user voice is completed, and provide/update response information through verification of reliability.

Figure 8:
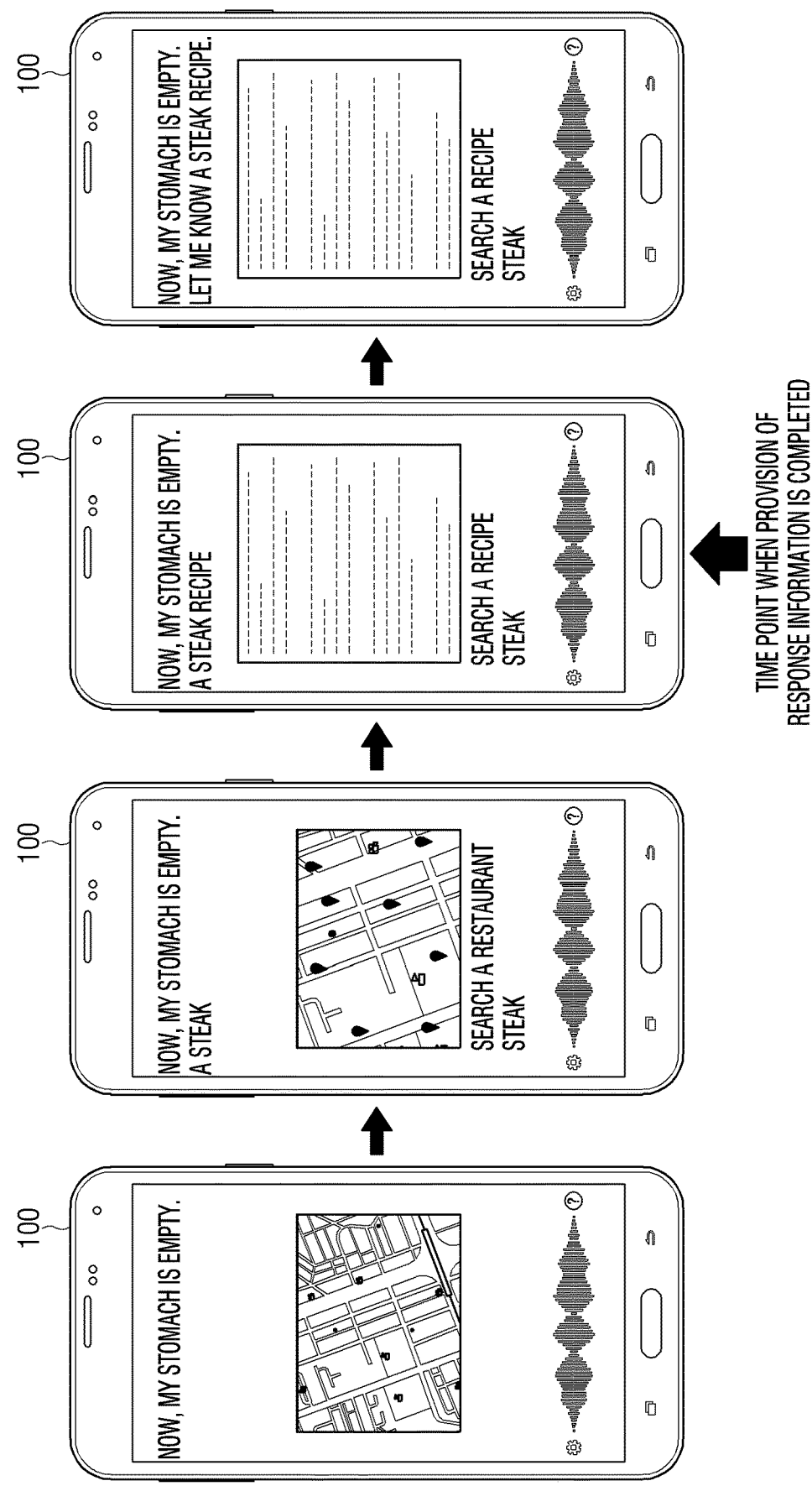
FIG. 8 is a diagram illustrating an embodiment of changing response information by recognizing an additionally uttered voice of a user.

FIG. 8 is a diagram illustrating an embodiment of changing response information by recognizing an additionally uttered voice of a user. In the drawing in the leftmost portion of FIG. 8, the processor 120 determined an intent as an intent of searching a restaurant on the basis of a user voice "Now, my stomach is empty" recognized so far. As the reliability of an intent of searching a restaurant was determined to be equal to or greater than a threshold value for preparation of a corresponding operation, the processor 120 may execute a map application for preparing provision of response information.

Referring to the second drawing from the left in FIG. 8, the processor 120 may additionally extract a name of an entity 'steak' from a user voice "Now, my stomach is empty. Is there a steak." As the reliability of an intent of searching a restaurant was determined to be equal to or greater than a threshold value for provision of response information, the processor 120 may control the display 130 to display an execution screen of a map application that searched steak houses that exist around the current location of the user.

Further, the processor 120 may identify that the newly determined utterance intention is different from the intent of searching a restaurant that is an utterance intention previously determined, on the basis of the additionally recognized words. The processor 120 may update response information by a method of replacing the response information screen such that response information corresponding to the newly determined utterance intention is provided.

Referring to the third drawing from the left in FIG. 8, the processor 120 may newly detect an intent of searching a recipe on the basis of a user voice "Now, my stomach is empty. A steak recipe." Then, the processor 120 may determine again the reliability of both the previous intent of searching a restaurant and an intent of searching a recipe which is a new intent. Also, on the basis of the word 'recipe' which was additionally uttered after a user voice intermediately recognized, the processor 120 may determine that the reliability of an intent of searching a recipe is equal to or greater than a predetermined value, and the reliability of an intent of searching a restaurant is smaller than a predetermined value. Accordingly, the processor 120 may control the display 130 to display response information for a search result of a steak recipe.

Referring to the drawing in the rightmost portion of FIG. 8, the processor 120 may maintain the response information screen that was previously provided. This is because, as a result of recognizing an additionally uttered voice of a user, there was no change in the reliability and there was no additionally recognized name of an entity, etc. The response information that the user actually wishes to receive was already provided at the time point when the electronic device was illustrated as the third device from the left in FIG. 8.

Figure 9:
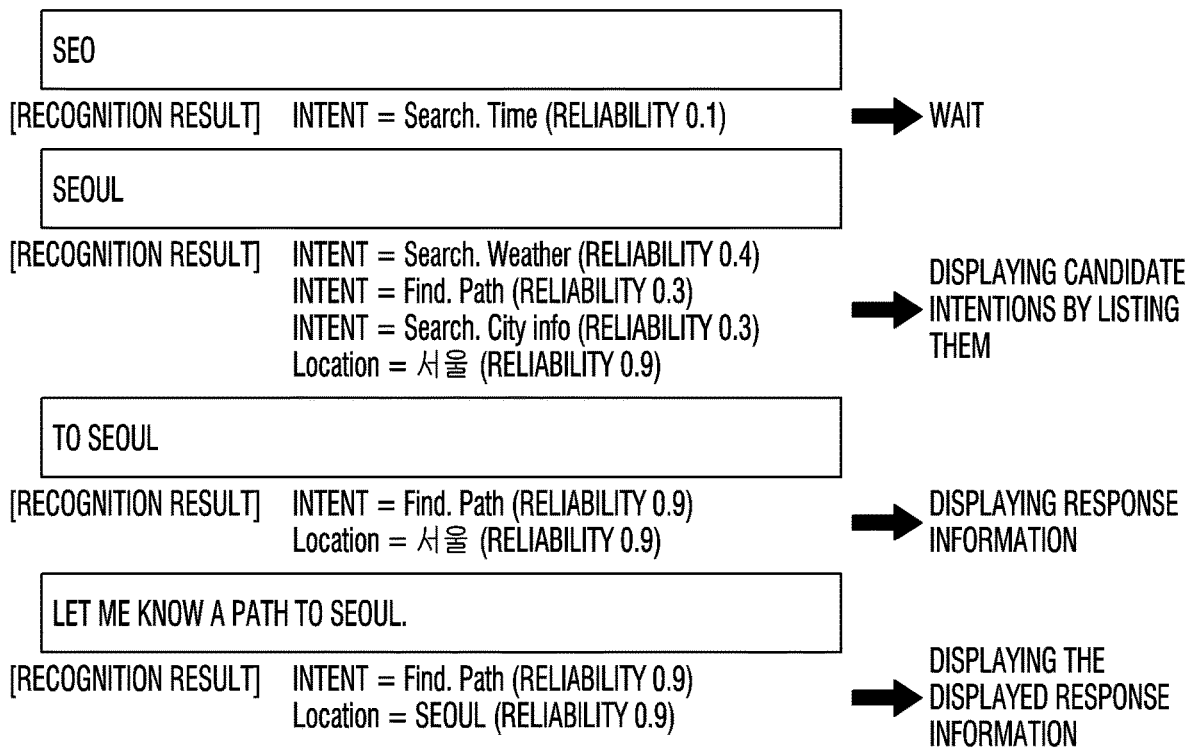
FIG. 9 is a diagram illustrating an embodiment of displaying a UI wherein a plurality of utterance intentions corresponding to a name of an entity can be selected.

FIG. 9 is a diagram illustrating an embodiment of displaying a UI wherein a word representing a name of an entity is recognized first, and then a plurality of utterance intentions corresponding to the name of an entity can be selected.

The processor 120 may predict a plurality of utterance intentions on the basis of a word included in a user voice input so far. Then, the processor 120 may determine the reliability of the plurality of predicted utterance intentions.

If the reliability of the plurality of determined utterance intentions is smaller than a predetermined value, the processor 120 may control the display 130 to display a list UI including the plurality of determined utterance intentions. Then, when a user input selecting an utterance intention among the plurality of displayed utterance intentions is received, the processor 120 may control the display 130 to display response information corresponding to the selected utterance intention.

Referring to FIG. 9, the processor 120 may predict an utterance intention from a user voice "Seo." For example, the processor 120 may predict an intent of asking time (Search.Time) by using history data that cases where a phoneme "Seo" was input first were mostly cases where time was asked. However, as the reliability of the predicted intent is low as 0.1, the processor 120 may wait for an additional utterance of a user without performing any operation.

Then, on the basis of the user additionally uttering as much as "Seoul," the processor 120 may extract 'Seoul' which is a name of an entity related to a location. Also, the processor 120 may predict a plurality of utterance intentions related to the extracted name 'Seoul.' For example, the processor 120 may predict an intent of searching weather (Search.Weather), an intent of finding a path (Find.Path), and an intent of searching city information (Search.Cityinfo) as utterance intentions.

As the reliability of all of the plurality of predicted utterance intentions is smaller than a predetermined value, the processor 120 may control the display 130 to display the plurality of predicted utterance intentions by listing them. If a user input selecting one of the plurality of displayed utterance intentions is received, the processor 120 may provide response information corresponding to the selected utterance intention. For example, if a user input selecting an intent of finding a path is received, the processor 120 may control the display 130 to display an execution screen of navigation.

In contrast, if a user input selecting one of the plurality of displayed utterance intentions is not received, the processor 120 may wait for an additional utterance of a user to be input. In the embodiment of FIG. 9, a case where there was no user input will be illustrated.

On the basis of a user voice input as much as "to Seoul," the processor 120 may adjust the reliability of an intent of finding a path to 0.9. Then, the processor 120 may execute a navigation application and search a path to Seoul by using an intent and a name of an entity having reliability equal to or greater than a predetermined value.

Afterwards, on the basis of a user voice input as much as "let me know a path to Seoul," the processor 120 may determine that there is no change in the reliability. As the determined utterance intentions of the user are identical and no additional information was input, the processor 120 may maintain the response information provided. Also, the processor 120 may already determine an utterance intention of the user before the user's utterance is completed, and provide response information swiftly.

Figure 10:
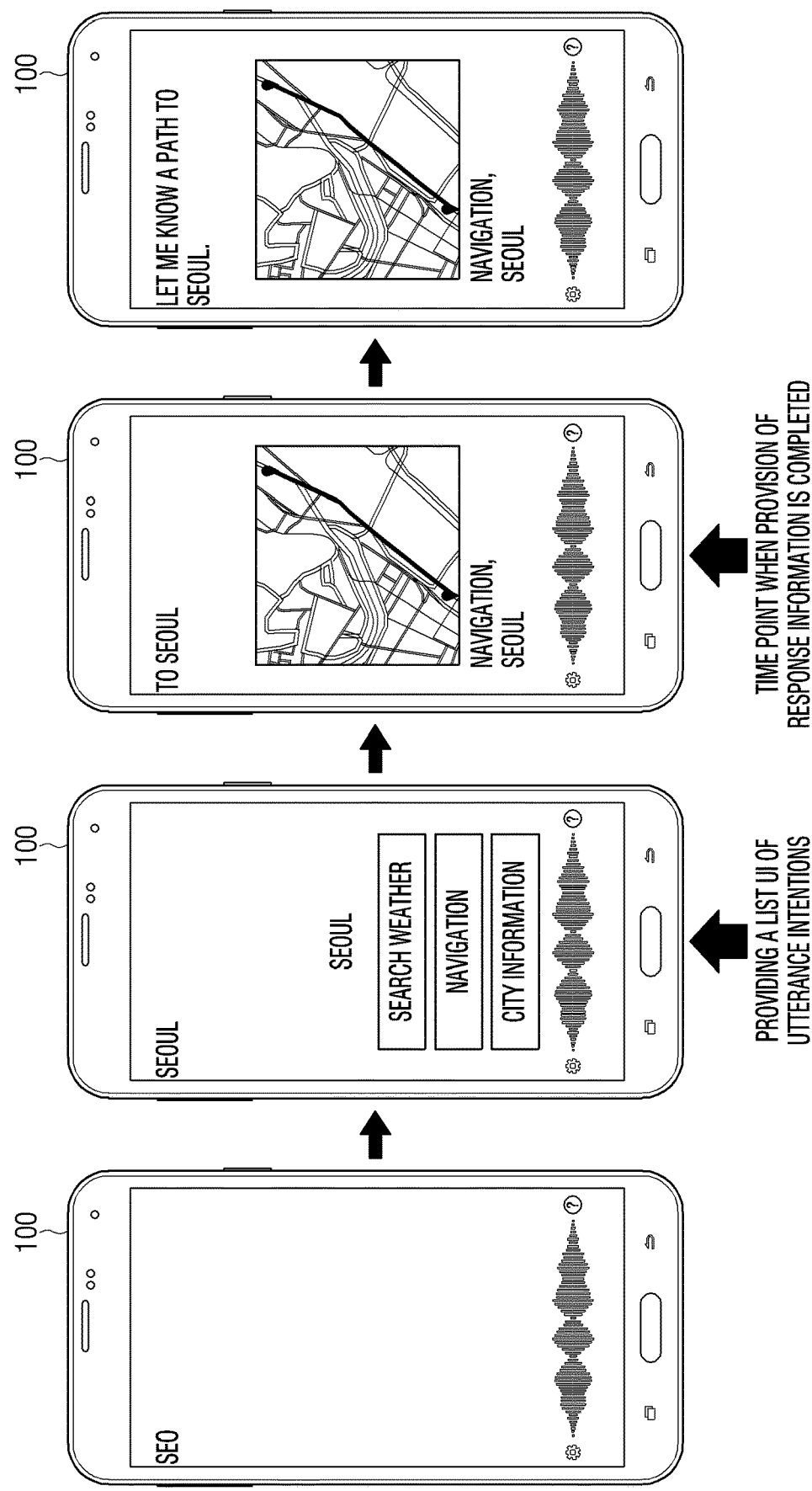
FIG. 10 is a diagram illustrating a screen provided according to the embodiment of FIG. 9.

FIG. 10 is a diagram illustrating a screen provided through the display 130 according to the embodiment of FIG. 9. Meanwhile, in FIG. 10, an embodiment in case there is a user input selecting an utterance intention is illustrated. Also, in FIG. 10, the electronic device 100 is illustrated from the left to the right according to the chronological order.

Referring to the drawing in the leftmost portion of FIG. 10, the processor 120 cannot determine an intent or a name of an entity on the basis of a user voice "Seo" recognized so far. Thus, the processor 120 may wait for an additionally uttered voice to be recognized.

The processor 120 may recognize 'Seoul' which is a name of an entity representing a location on the basis of a user voice input as much as "Seoul." Then, the processor 120 may predict a plurality of utterance intentions related to 'Seoul.' If the reliability of the plurality of predicted utterance intentions is determined to be smaller than a predetermined value, the processor 120 may display the plurality of utterance intentions, and receive selection of a user. Also, as can be seen in the second drawing from the left in FIG. 10, the processor 120 may control the display 130 to display a list UI wherein 'search weather,' 'navigation,' and 'city information' corresponding to a plurality of utterance intentions related to a name of an entity 'Seoul' can be selected.

In the embodiment of FIG. 10, description will be made based on the assumption that a user selected 'navigation' to correspond to the utterance intention. However, as described with respect to FIG. 9, the processor 120 can obviously determine an utterance intention by using an additionally uttered voice.

The processor 120 may provide a response screen corresponding to the selected utterance intention. As can be seen in the third drawing from the left in FIG. 10, the processor 120 may execute a navigation application, and search a path from the current location of a user to Seoul.

Also, the processor 120 may identify a correct utterance intention by selection of a user. Accordingly, the processor 120 may use user voice data of which utterance was completed as learning data for reinforcing a voice recognition model, as can be seen in the rightmost drawing in FIG. 10.

Figure 11:
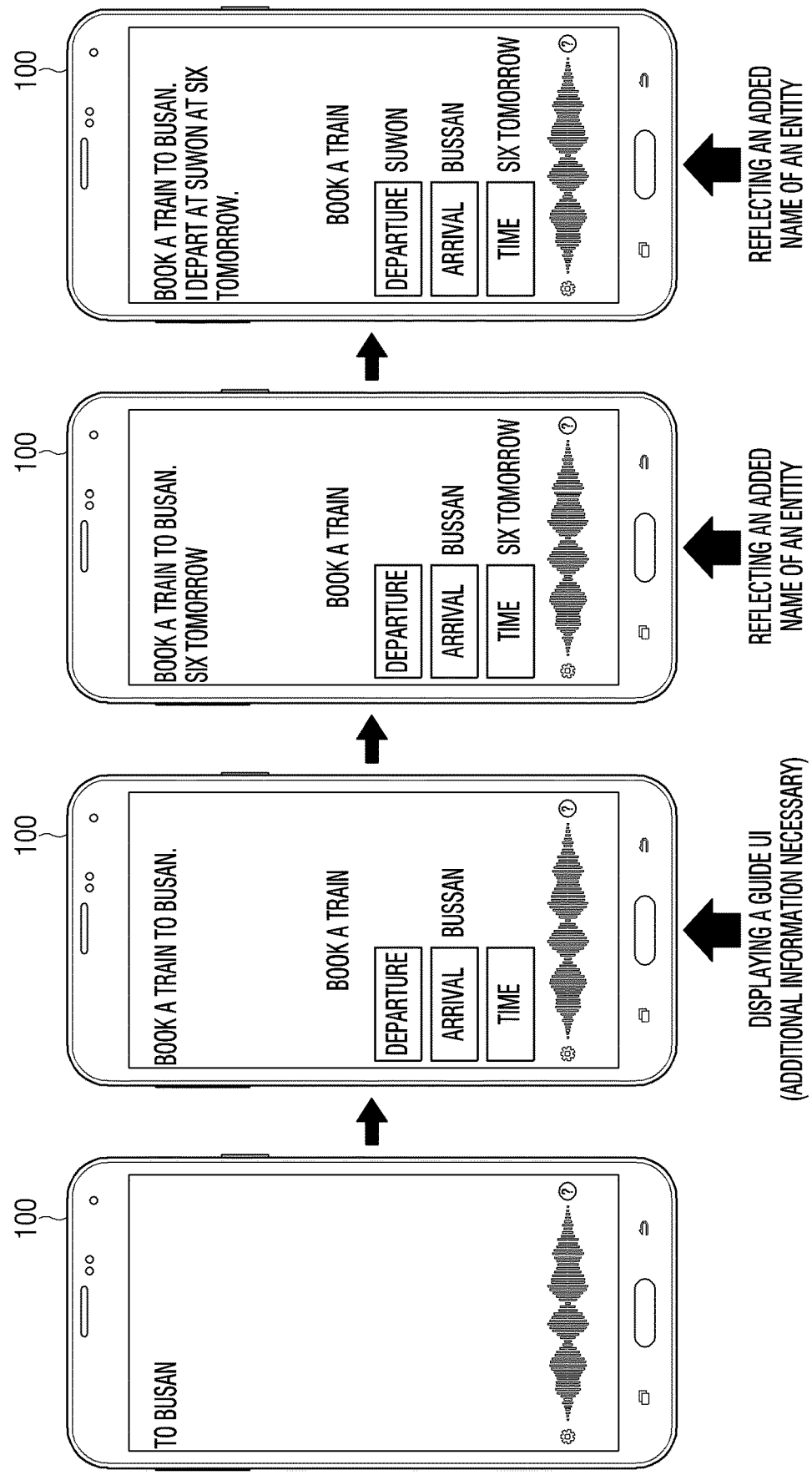
FIG. 11 is a diagram illustrating an embodiment of displaying a UI inducing a user to utter additional information.

FIG. 11 is a diagram illustrating an embodiment of displaying a UI inducing a user to utter additional information necessary for performing an operation corresponding to a determined utterance intention.

Referring to the drawing in the leftmost portion of FIG. 11, it can be figured out that a user voice input so far is "to Busan." The processor 120 may determine an intent of finding a path (Find.Path), an intent of booking a train (Book.Train), etc. through a user voice recognized so far. If the reliability of the determined intentions is smaller than a predetermined value, the processor 120 may wait for an additional utterance of a user as in FIG. 11.

Then, on the basis of a user voice "Book a train to Busan," the processor 120 may determine that the utterance intention of a user is an intention of booking a train. Further, the processor 120 may perform an operation corresponding to the determined utterance intention. Meanwhile, pieces of information necessary for an operation of booking a train are 'departure,' 'destination,' and 'time.' On the basis of a user voice uttered so far, the processor 120 can only determine that the destination is Busan, among the necessary pieces of information.

In a conventional function of a virtual personal assistant, in case additional information was necessary, questions were asked to a user with respect to each piece of necessary information, and answers to the questions were received. Accordingly, there was a problem that additional conversation turns were generated as many as the number of necessary pieces of information.

The electronic device 100 according to an embodiment of the disclosure may display a guide UI informing what kind of information is necessary for a corresponding operation, and whether necessary information was input, as illustrated in the second drawing from the left in FIG. 11. By displaying a guide UI, the processor 120 may induce a user to utter necessary information without additional conversation turns.

As illustrated in FIG. 11, the processor 120 may determine whether necessary information was input on the basis of a content that a user additionally uttered. Also, the processor 120 may control the display 130 to display a content input to a guide UI when necessary information is input. For example, from an additional utterance of a user "six tomorrow," the processor 120 may add an indication 'six tomorrow' in the 'time' field. Also, from an additional utterance of a user "Depart at Suwon," the processor 120 may add an indication 'Suwon' to the 'departure' field.

The electronic device 100 according to the various embodiments of the disclosure as described above can enhance the response speed of a virtual personal assistant. Also, the electronic device 100 can perform an operation induced by a user with minimum conversation turns. Through this, a user can acquire a user experience with respect to a fast and correct virtual personal assistant function.

As described above, the electronic device 100 may perform both the operation of obtaining an utterance intention of a user, and the operation of generating response information corresponding to the utterance intention. However, the server 200 may become a main subject performing a virtual personal assistant function. That is, implementation may be made such that the electronic device 100 performs only input and output operations, and the server 200 performs the other functions.

In a method for obtaining an utterance intention of a user according to an embodiment of the disclosure, an intention is determined by processing a user utterance in real time. Accordingly, quick communication speed between the server 200 and the electronic device 100 is required. For example, when a virtual personal assistant function is executed at the electronic device 100, a dedicated communication channel may be established between the server 200. The electronic device 100 may transmit a received user voice to the server 200. Then, the server 200 may determine an utterance intention from the user voice, generate corresponding response information, and transmit the information to the electronic device 100. The electronic device 100 may output the received response information and provide it to a user.

FIGS. 12 to 15 are diagrams for illustrating a method for obtaining an utterance intention of a user according to the various embodiments of the disclosure.

Figure 12:
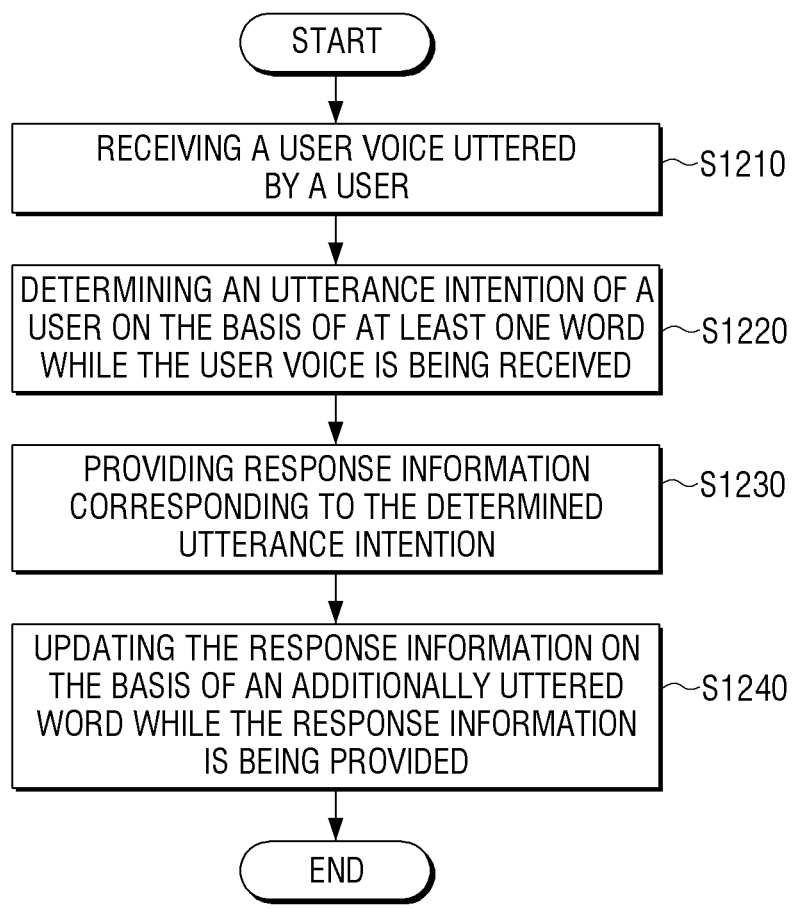
FIGS. 12 to 15 are flow charts for illustrating a method for obtaining an utterance intention of a user of an electronic device according to various embodiments of the disclosure.

Referring to FIG. 12, the electronic device 100 may receive a user voice uttered by a user at operation S1210. Also, while a user voice is being received, the electronic device 100 may determine an utterance intention of a user on the basis of at least one word included in the user voice at operation S1220. That is, the electronic device 100 may determine an utterance intention in real time on the basis of a user voice input so far, even before an utterance of a user is completed. Also, as the electronic device 100 goes through a verification process of measuring the reliability of the determined utterance intention, the electronic device 100 may not provide a result that is totally different from an utterance intention of a user.

Further, the electronic device 100 may provide response information corresponding to the determined utterance intention of a user at operation S1230. Also, the electronic device 100 may display a screen of a result of performing an operation corresponding to the utterance intention. For example, the electronic device 100 may display a screen of a result of searching today's weather. In addition, the electronic device 100 may perform an operation corresponding to an utterance intention. For example, the electronic device 100 may set an alarm in response to a user utterance.

Also, on the basis of an additional word uttered after at least one word was input while response information is being provided, the electronic device 100 may update response information at operation S1240. The electronic device 100 may provide response information on the basis of a user voice recognized so far, and afterwards, determine again the utterance intention of a user on the basis of the entire user voice including the additionally uttered user voices. Accordingly, as user utterances are additionally made, the electronic device 100 may update response information in real time and provide the information.

For example, if an utterance intention of a user was determined correctly, the electronic device 100 may provide more correct and detailed response information based on contents recognized from additional utterances. In contrast, the electronic device 100 may recognize that an utterance intention of a user was determined incorrectly based on contents recognized from additional utterances. Also, the electronic device 100 may update response information as response information corresponding to a newly determined utterance intention of a user, and provide the information.

Figure 13:
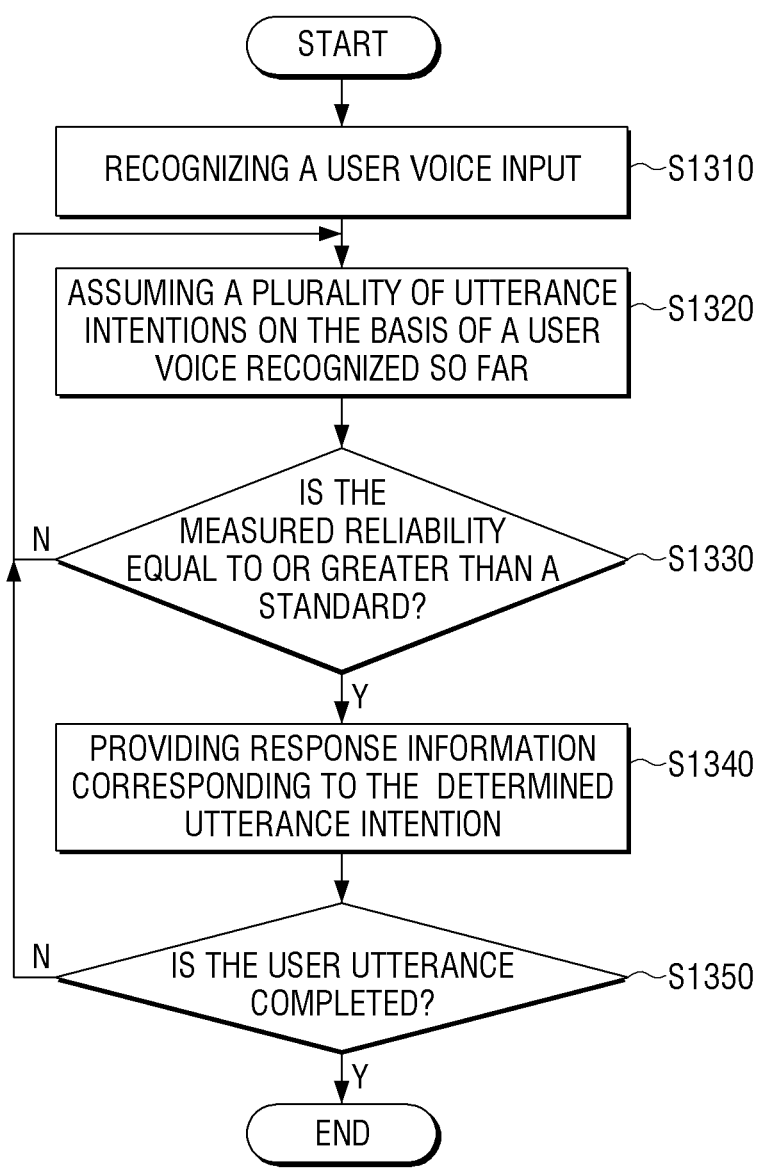

FIG. 13 is a flow chart illustrating an embodiment of obtaining an utterance intention of a user through a verification process of measurement of reliability. Referring to FIG. 13, the electronic device 100 may receive a user voice uttered by a user. Then, the electronic device 100 may recognize the user voice input at operation S1310.

The electronic device 100 may assume a plurality of utterance intentions on the basis of a user voice recognized so far at operation S1320. For example, the electronic device 100 may extract a keyword corresponding to an intent or a name of an entity from a user voice recognized so far. Then, the electronic device 100 may assume a plurality of utterance intentions on the basis of at least one keyword extracted.

Further, the electronic device 100 may measure the reliability of each of the plurality of assumed utterance intentions at operation S1330. If the reliability of all of the plurality of utterance intentions is smaller than a predetermined standard at operation S1330-N, the electronic device 100 may wait for an additional utterance of a user to be input. In contrast, if an utterance intention having reliability equal to or greater than a predetermined value is detected among the plurality of utterance intentions at operation S1330-Y, the electronic device 100 may determine the detected utterance intention as the utterance intention of a user. Then, the electronic device may provide response information corresponding to the determined utterance intention at operation S1340.

Further, the electronic device 100 may determine whether a user utterance was completed at operation S1350. If there are user voices additionally uttered at operation S1350-N, the electronic device 100 may assume again a plurality of utterance intentions on the basis of the entire user voice including the additionally uttered user voices. When it is determined that a user utterance was completed at operation S1350-Y, the electronic device 100 may maintain the state of providing response information, and wait for a next user utterance to be input.

Figure 14:
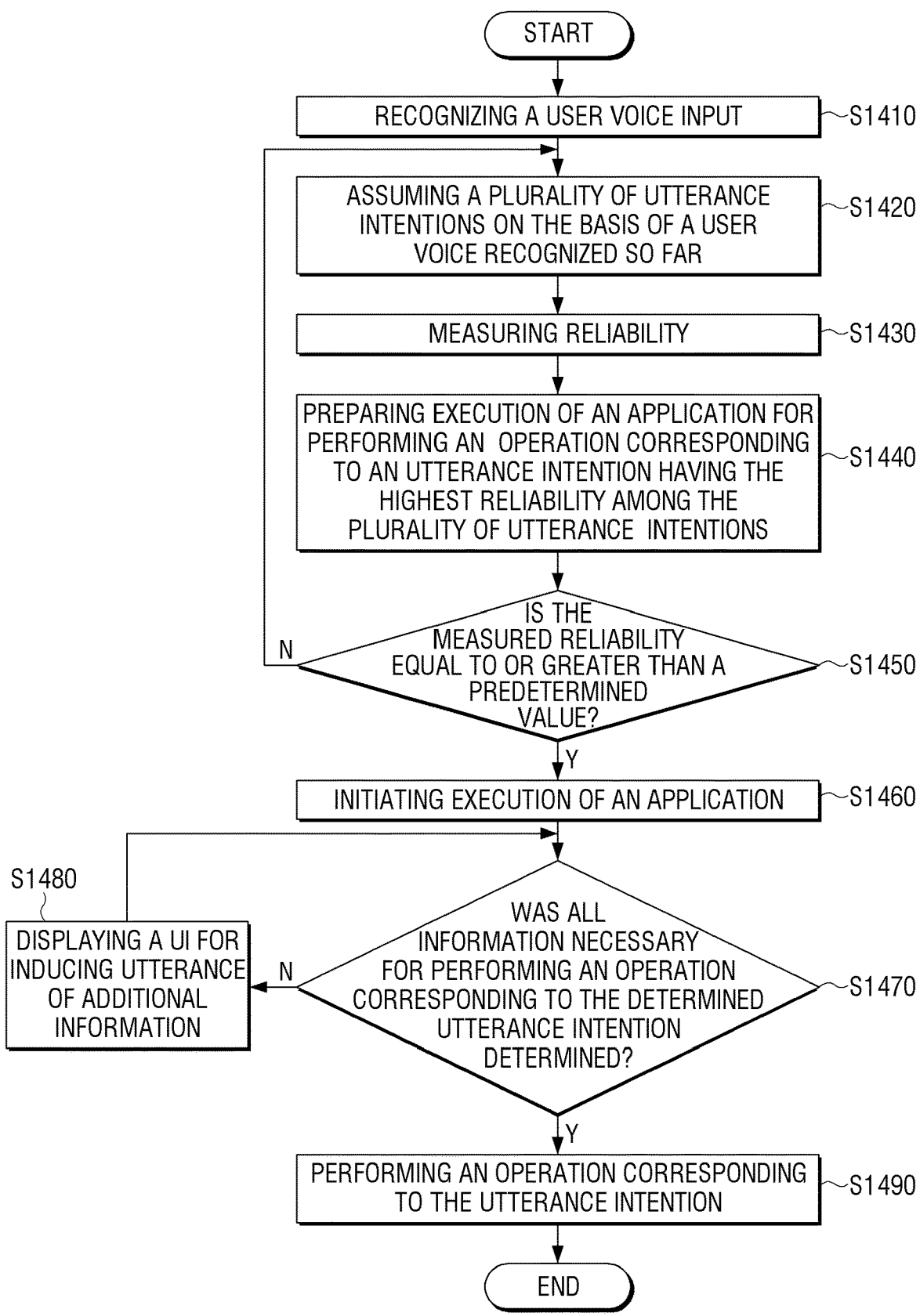

FIG. 14 is a flow chart illustrating in more detail a method for obtaining an utterance intention of a user of an electronic device 100 according to an embodiment of the disclosure. Referring to FIG. 14, the electronic device 100 may receive a user voice uttered by a user. Then, the electronic device 100 may recognize the user voice input at operation S1410.

The electronic device 100 may assume a plurality of utterance intentions on the basis of a user voice recognized so far at operation S1420. Then, the electronic device 100 may measure the reliability of each of the plurality of assumed utterance intentions at operation S1430. For example, in case a specific word was input, the electronic device 100 may statistically analyze what an utterance intention of a user was like by using big data and history data of the user. Meanwhile, reliability may be a value which expresses a result of statistical analysis as a numerical value. For example, reliability may be defined as a value between 0 and 1.

Further, the electronic device 100 may prepare a corresponding operation during an utterance of a user, for providing a quick response to a user voice. The electronic device 100 may prepare an operation corresponding to an utterance intention having the highest reliability among a plurality of utterance intentions at operation S1440. For example, the electronic device 100 may execute an application used for performing an operation corresponding to an utterance intention as a background. As another example, the electronic device 100 may activate a component of the electronic device 100 used for performing an operation corresponding to an utterance intention.

If the reliability of all of the plurality of utterance intentions is smaller than a predetermined standard at operation S1450-N, the electronic device 100 may wait for an additional utterance of a user to be input. In contrast, if an utterance intention having reliability equal to or greater than a predetermined value is detected among the plurality of utterance intentions at operation S1450-Y, the electronic device 100 may determine the detected utterance intention as the utterance intention of a user. Then, the electronic device 100 may execute an application for an operation corresponding to the determined utterance intention at operation S1460.

Further, the electronic device 100 may identify whether all pieces of information necessary for performing an operation corresponding to the detected utterance intention were determined from a user voice at operation S1470. For example, if the utterance intention is ordering delivery of food, the electronic device 100 needs information such as the type of food, the delivery company, the payment method, etc. As another example, if the utterance intention is booking a train, the electronic device 100 needs information such as the departure, the destination, the time for booking, the payment method, etc.

If additional information is necessary for performing an operation at operation S1470-N, the electronic device 100 may display a UI inducing a user to utter additional information at operation S1480. Also, the electronic device 100 may prevent generation of additional conversation turns by inducing a user to utter all information in the conversation turn this time. In case all information for performing an operation is collected at operation S1470-Y, the electronic device 100 may perform an operation corresponding to the utterance intention at operation S1490.

Figure 15:
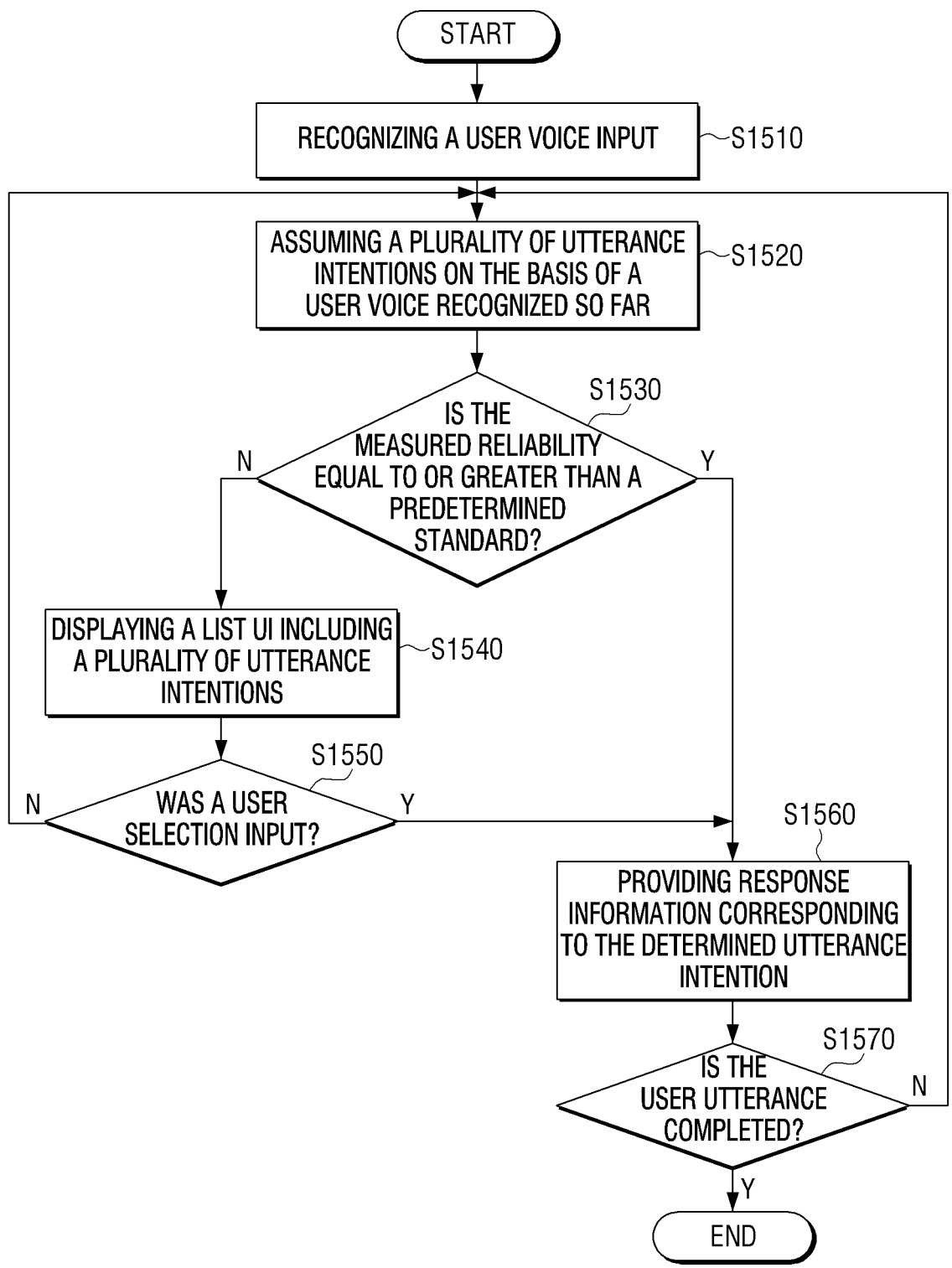

FIG. 15 is a flow chart illustrating in detail a method for obtaining an utterance intention of a user of an electronic device 100 according to another embodiment of the disclosure. Referring to FIG. 15, the electronic device 100 may receive a user voice uttered by a user. Then, the electronic device 100 may recognize the user voice input at operation S1510.

The electronic device 100 may assume a plurality of utterance intentions on the basis of a user voice recognized so far at operation S1520. Then, the electronic device 100 may measure the reliability of each of the plurality of assumed utterance intentions at operation S1530. In case there is an utterance intention of which measured reliability is equal to or greater than a predetermined standard at operation S1530-Y, the electronic device 100 may provide response information corresponding to the utterance intention at operation S1560.

If the reliability of all of the plurality of utterance intentions is smaller than a predetermined standard at operation S1530-N, the electronic device 100 may display a list UI including the plurality of assumed utterance intentions at operation S1540. Displaying a list of utterance intentions and receiving a user selection can be used effectively, particularly when a keyword corresponding to an intent is not extracted, but only a keyword corresponding to a name of an entity is extracted. If a user selection is not input at operation S1550-N, the electronic device 100 may wait for an additional utterance of a user.

When a user input selecting an utterance intention among the plurality of displayed utterance intentions is received at operation S1550-Y, the electronic device 100 may provide response information corresponding to the selected utterance intention at operation S1560. In case an utterance intention of a user is determined through a user input, the electronic device 100 may store user voice data and the determined utterance intention, and use them for learning a data recognition model.

Then, the electronic device 100 may determine whether a user utterance was completed at operation S1570. If there are user voices additionally uttered at operation S1570-N, the electronic device 100 may assume again a plurality of utterance intentions on the basis of the entire user voice including the additionally uttered user voices. When it is determined that a user utterance was completed at operation S1570-Y, the electronic device 100 may maintain the state of providing response information, and wait for a next user utterance to be input.

Figure 16:
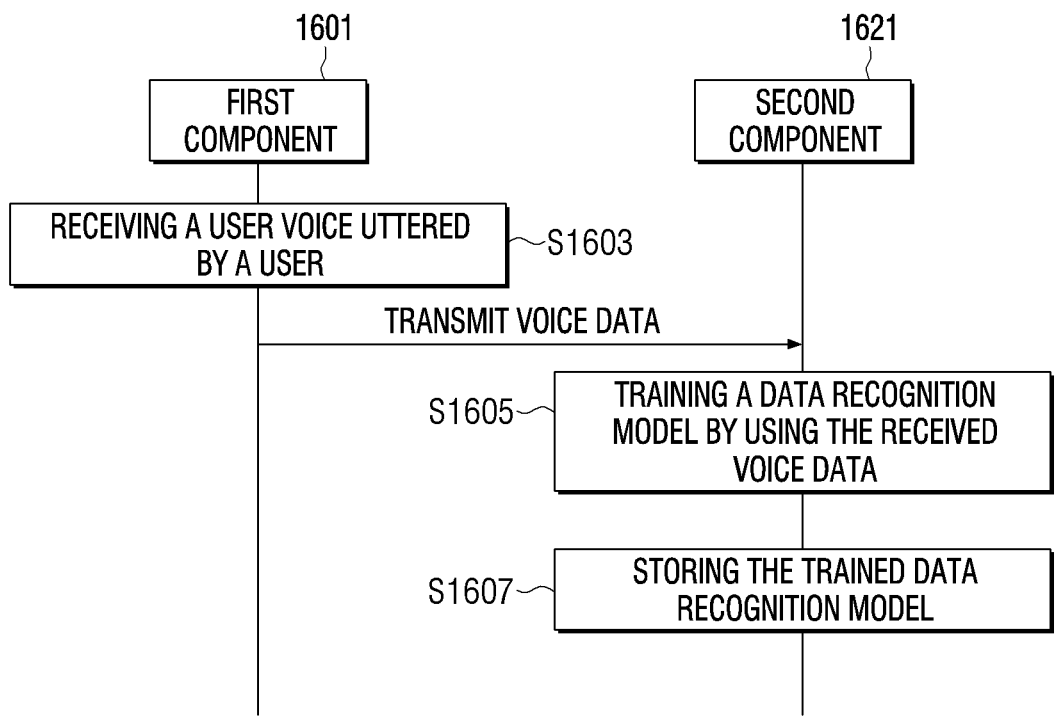
FIG. 16 is a sequence diagram illustrating a method for a system including an electronic device and a server to construct a data recognition model according to an embodiment of the disclosure.

FIG. 16 is a sequence diagram illustrating a method for a system including an electronic device and a server to construct a data recognition model according to an embodiment of the disclosure. Here, a system for constructing a data recognition model may include a first component 1601 and a second component 1621.

As an example, the first component 1601 may be the electronic device 100, and the second component 1621 may be the server 200. Alternatively, the first component 1601 may be a generic-purpose processor, and the second component 1621 may be an artificial intelligence dedicated processor. Or, the first component 1601 may be at least one application, and the second component 1621 may be an operating system (OS).

That is, the second component 1621 may be a component that is more integrated, more dedicated, has less delay, has superior performance, or has more resources than the first component 1601, and that is capable of processing operations required in generating, updating, or applying a data recognition model more swiftly and effectively than the first component 1601.

In this case, an interface for transmitting/receiving data (voice data) may be defined between the first component 1601 and the second component 1621.

For example, an application program interface (API) function having learning data to be applied to a data recognition model as a factor value (or, a medium value or a transmission value) may be defined. In this case, when the first component 1601 calls the API function and inputs voice data as a data factor value, the API function may transmit the voice data to the second component 1621 as learning data to be applied to a data recognition model.

The first component 1601 may receive a user voice uttered by a user at operation S1603. Then, the first component 1601 may transmit voice data for the user voice to the second component 1621.

The second component 1621 may train a data recognition model by using the received voice data at operation S1605.

Also, the second component 1621 may store the trained data recognition model at operation S1607.

Meanwhile, in the embodiment described above, it was described that the second component 1621 stores a trained data recognition model. However, this is merely an example, and the second component 1621 may transmit a trained data recognition model to the first component 1601, and the first component 1601 may store the data recognition model.

Figure 17:
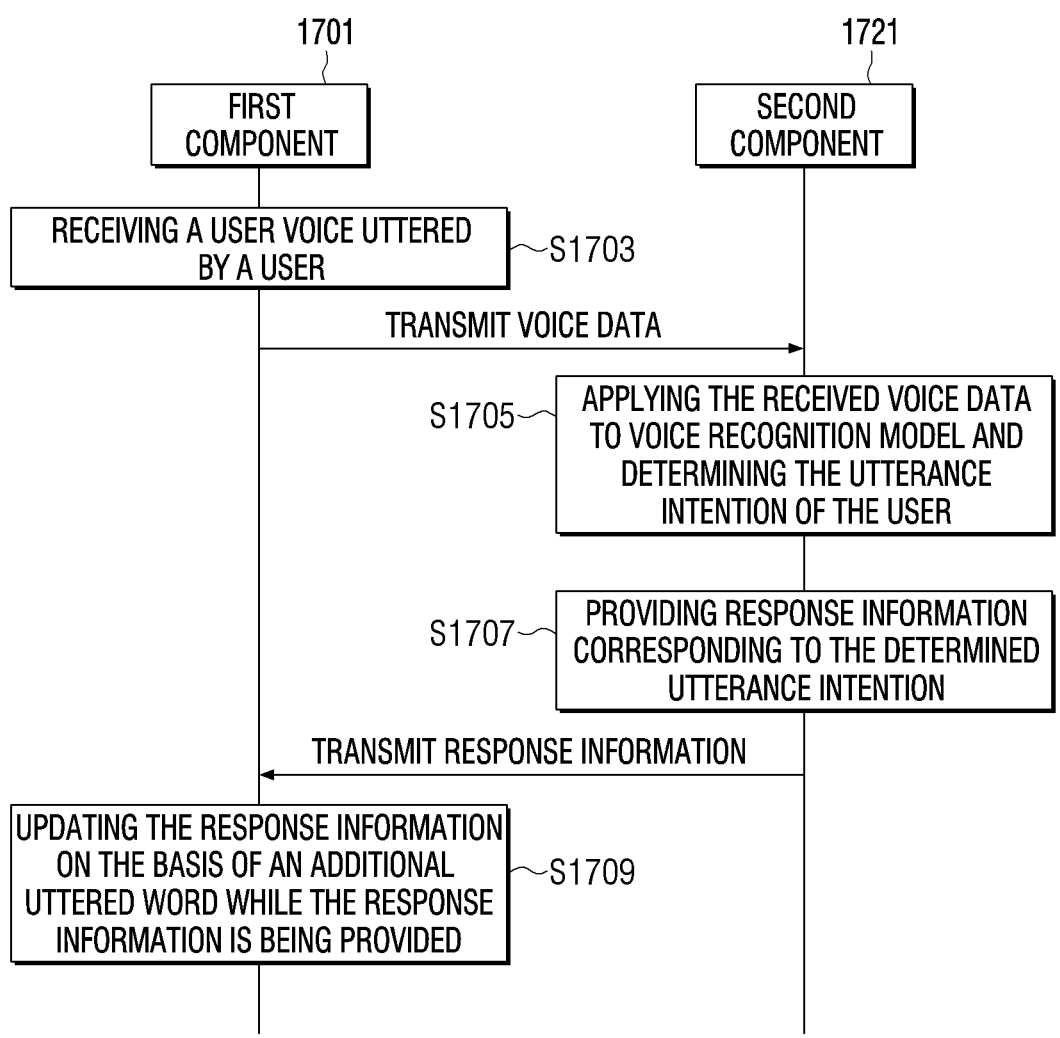
FIG. 17 is a sequence diagram illustrating a method for a system including an electronic device and a server to recognize data according to an embodiment of the disclosure.

FIG. 17 is a sequence diagram illustrating a method for a system including an electronic device and a server to recognize data according to an embodiment of the disclosure. Here, a system for recognizing data by using a data recognition model may include a first component and a second component.

As an example, the first component 1701 may be an electronic device, and the second component 1721 may be a server. Alternatively, the first component 1701 may be a generic-purpose processor, and the second component 1721 may be an artificial intelligence dedicated processor. Or, the first component 1701 may be at least one application, and the second component 1721 may be an operating system.

In this case, an interface for transmitting/receiving data (e.g., a video, a synthesized image, or a result of recognizing a video) may be defined between the first component 1701 and the second component 1721.

For example, an API function having recognition data to be applied to a trained data recognition model as a factor value (or, a medium value or a transmission value), and having a recognition result of a data recognition model as an output value may be defined. In this case, when the first component 1701 calls the API function and inputs voice data as a data factor value, the API function may transmit the voice data to the first component 1701 as learning data to be applied to a data recognition model. Then, when a recognition result of a video is received from the second component 1721, the first component 1701 may provide response information corresponding to an utterance intention of a user as an output value of the API function.

The first component 1701 may receive a user voice uttered by a user at operation S1703. Then, the first component 1701 may transmit voice data for at least one word included in the voice uttered by the user while the user voice is being received to the second component 1721.

The second component 1721 may apply the received voice data for at least one word to a voice recognition model, and determine the utterance intention of the user at operation S1705.

Then, the second component 1721 may provide response information corresponding to the determined utterance intention at operation S1707, and transmit the response information to the first component 1721.

The first component 1701 may display a screen of a result of performing an operation corresponding to the utterance intention. Also, the first component 1701 may perform an operation corresponding to the utterance intention.

Further, the first component 1701 may update response information on the basis of an additional word uttered after at least one word was input while response information is being provided at operation S1709.

Meanwhile, in the embodiment described above, it was described that the first component 1701 generates voice data. However, this is merely an example, and the second component 1721 may receive a voice input, and generate voice data including at least one word.

Some embodiments of the disclosure may be implemented as S/W programs including instructions stored in computer-readable storage media.

For example, a computer is a device that calls stored instructions from storage media, and is capable of operating according to the embodiments disclosed herein pursuant to the called instructions, and it may include devices according to the embodiments disclosed herein, or external servers that are communicatively connected to devices.

A storage medium that is readable by computers may be provided in the form of a non-transitory storage medium. Here, the term 'non-transitory' only means that a storage medium does not include signals or currents, and is tangible, but does not indicate whether data is stored in the storage medium semi-permanently or temporarily. For example, a non-transitory storage medium may include not only non-transitory computer-readable recording media such as a CD, a DVD, a hard disk, a blue-ray disk, a USB, an internal memory, a memory card, a ROM or a RAM, but also transitory storage media such as a register, a cache, or a buffer.

Also, the methods according to the embodiments disclosed herein may be provided as computer program products.

Computer program products may include S/W programs, computer-readable storage media storing S/W programs, or products traded between sellers and buyers.

For example, computer program products may include products in the form of a S/W program (e.g., downloadable apps) that are electronically distributed through device manufacturers or electronic markets (e.g., Google Play Store, App Store). For electronic distribution, at least some portions of S/W programs may be stored in storage media, or generated temporarily. In this case, storage media may be storage media of servers of manufacturers or electronic markets, or relay servers.

While the disclosure has been described with reference to limited embodiments and drawings as above, it should be noted that the disclosure is not limited to the aforementioned embodiments, and various amendments and modifications may be made from the descriptions of the disclosure by those having ordinary skill in the art to which the disclosure belongs. Therefore, the scope of the disclosure is not to be defined while being limited to the embodiments described above, but by the appended claims and the equivalents of the claims.

What is claimed is:

1. An electronic device comprising:
a memory configured to store a model for obtaining user intention information from a user voice uttered by a user of the electronic device;
a microphone;
a display; and
one or more processors configured to:
receive, in a first period via the microphone, a first user voice uttered by the user,
apply the first user voice, received in the first period, to the stored model,
obtain first user intention information based on applying the first user voice to the stored model while a second user voice is received via the microphone in a second period after the first period,
during the second period after the first period:
receive, via the microphone, the second user voice uttered by the user; and
while receiving the second user voice uttered by the user, display, on the display, first response information corresponding to the obtained first user intention information including a user interface (UI) inducing the user to utter additional information corresponding to the obtained first user intention information, the first response information comprising a first execution screen of an application executed based on the first user intention information,
in response to receiving the second user voice including the additional information uttered by the user while displaying the first response information, apply both of the received first user voice and the received second user voice to the stored model or apply the received second user voice to the stored model, and
based on the applying of both of the received first user voice and the received second user voice to the stored model or the applying of the received second user voice to the stored model being performed while the first response information is being displayed, obtain second response information related to the first response information and change the first response information to the second response information by displaying, on the display, the second response information, the second response information comprising a second execution screen of the application different from the first execution screen.

2. The electronic device of claim 1, wherein the one or more processors is further configured to:
based on at least one word being included in the first user voice, obtain a reliability of each of a plurality of utterance intentions, and
based on detecting that an utterance intention among the plurality of utterance intentions has a reliability equal to or greater than a predetermined value, obtain the detected utterance intention as an utterance intention of the user.

3. The electronic device of claim 2, wherein the one or more processors is further configured to initiate an operation for preparing an execution of the application for performing an operation corresponding to an utterance intention having a highest reliability among the plurality of utterance intentions.

4. The electronic device of claim 2, wherein the one or more processors is further configured to, based on detecting that the utterance intention has the reliability equal to or greater than the predetermined value, control the display to display an execution screen of the application for performing an operation corresponding to the detected utterance intention.

5. The electronic device of claim 4, wherein the one or more processors is further configured to control the display to display the UI inducing the user to utter the additional information necessary for performing the operation corresponding to the detected utterance intention.

6. The electronic device of claim 2, wherein the one or more processors is further configured to:
based on the reliability of each of the plurality of utterance intentions being smaller than the predetermined value, control the display to display a list UI including the plurality of utterance intentions, and
based on receiving a user input selecting an utterance intention among the plurality of utterance intentions being displayed, provide response information corresponding to the selected utterance intention.

7. The electronic device of claim 1, wherein the one or more processors is further configured to, based on an utterance intention newly obtained based on an additional word being different from an utterance intention obtained based on at least one word, provide updated response information corresponding to the newly obtained utterance intention.

8. The electronic device of claim 1, wherein the one or more processors is further configured to control the display to display response information.

9. The electronic device of claim 8, wherein the response information comprises a name of an entity and an intention.

10. A method of an electronic device comprising:
storing, in a memory, a model for obtaining user intention information from a user voice uttered by a user of the electronic device;
receiving, in a first period via a microphone, a first user voice uttered by the user;
applying the first user voice, received in the first period, to the stored model;
obtaining first user intention information based on applying the first user voice to the stored model while a second user voice is received via the microphone in a second period after the first period;
during the second period after the first period:
receiving, via the microphone, the second user voice uttered by the user, and
while receiving the second user voice uttered by the user, displaying, on a display, first response information corresponding to the obtained first user intention information including a user interface (UI) inducing the user to utter additional information corresponding to the obtained first user intention information, the first response information comprising a first execution screen of an application executed based on the first user intention information;
in response to receiving the second user voice including the additional information uttered by the user while displaying the first response information, applying both the received first user voice and the received second user voice to the stored model or applying the received second user voice to the stored model; and
based on the applying of both of the received first user voice and the received second user voice to the stored model or the applying of the received second user voice to the stored model being performed while the first response information is being displayed, obtaining second response information related to the first response information and changing the first response information to the second response information by displaying, on the display, the second response information, the second response information comprising a second execution screen of the application different from the first execution screen.

11. The method of claim 10, further comprising:
obtaining a reliability of each of a plurality of utterance intentions based on at least one word being included in the first user voice;
detecting an utterance intention having a reliability equal to or greater than a predetermined value among the plurality of utterance intentions; and
obtaining the detected utterance intention as an utterance intention of the user.

12. The method of claim 11, further comprising initiating an operation for preparing an execution of the application for performing an operation corresponding to an utterance intention having a highest reliability among the plurality of utterance intentions.

13. The method of claim 11, further comprising based on detecting that the utterance intention having the reliability equal to or greater than the predetermined value, displaying an execution screen of the application for performing an operation corresponding to the detected utterance intention.

14. The method of claim 13, further comprising displaying the UI inducing the user to utter the additional information necessary for performing the operation corresponding to the detected utterance intention.

15. The method of claim 11, further comprising:
based on the reliability of each of the plurality of utterance intentions being smaller than the predetermined value, displaying a list UI including the plurality of utterance intentions; and
based on receiving a user input selecting an utterance intention among the plurality of utterance intentions being displayed, providing response information corresponding to the selected utterance intention.

16. The electronic device of claim 1,
wherein the first response information further comprises location information and the second response information further comprises a type of entity, and
wherein the one or more processors is further configured to:
display the location information as at least part of the first response information, and
display indicators on the location information at one or more locations corresponding to the type of entity as the second response information.

* * * * *